US009171454B2

(12) United States Patent
Wilson et al.

(10) Patent No.: US 9,171,454 B2
(45) Date of Patent: Oct. 27, 2015

(54) MAGIC WAND

(75) Inventors: Andrew David Wilson, Seattle, WA (US); James E. Allard, Seattle, WA (US); Michael H. Cohen, Seattle, WA (US); Steven Drucker, Bellevue, WA (US); Yu-Ting Kuo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1330 days.

(21) Appl. No.: 11/939,739

(22) Filed: Nov. 14, 2007

(65) Prior Publication Data

US 2009/0121894 A1 May 14, 2009

(51) Int. Cl.
*G05B 11/01* (2006.01)
*G08C 17/00* (2006.01)

(52) U.S. Cl.
CPC ............ *G08C 17/00* (2013.01); *G08C 2201/30* (2013.01); *G08C 2201/32* (2013.01); *G08C 2201/51* (2013.01)

(58) Field of Classification Search
CPC ........................................................ G08C 19/28
USPC ............ 340/825.49, 825.69, 12.22, 4.11, 5.1, 340/5.61; 715/863; 382/103, 154
See application file for complete search history.

(56) References Cited

U.S. PATENT DOCUMENTS 5,227,985 A 7/1993 DeMenthon
5,252,951 A 10/1993 Tannenbaum et al.
5,317,140 A 5/1994 Dunthorn
5,459,489 A 10/1995 Redford
5,594,469 A 1/1997 Freeman et al.
5,753,931 A 5/1998 Borchers et al.
5,828,369 A 10/1998 Foster
5,943,476 A 8/1999 Dougherty et al.
6,057,845 A 5/2000 Dupouy
6,115,028 A 9/2000 Balakrishnan et al.
6,128,003 A * 10/2000 Smith et al. ................... 345/157
(Continued)

FOREIGN PATENT DOCUMENTS

EP 1653391 A2 5/2006
JP 8506193 7/1996
(Continued)

OTHER PUBLICATIONS

Office Action for U.S. Appl. No. 12/185,166, mailed on May 5, 2011, Meredith J. Morris, "A User-Defined Gesture Set for Surface Computing".

(Continued)

*Primary Examiner* — Vernal Brown
(74) *Attorney, Agent, or Firm* — Gregg R. Wisdom; Judy Yee; Micky Minhas

(57) ABSTRACT

The claimed subject matter relates to an architecture that can facilitate rich interaction with and/or management of environmental components included in an environment. The architecture can exist in whole or in part in a housing that can resemble a wand or similar object. The architecture can utilize one or more sensor from a collection of sensors to determine an orientation or gesture in connection with the wand, and can further issue an instruction to update a state of an environmental component based upon the orientation. In addition, the architecture can include an advisor component to provide contextual and/or comprehensive guidance in an intuitive manner.

20 Claims, 12 Drawing Sheets

(56) References Cited

U.S. PATENT DOCUMENTS

| | | | |
|---|---|---|---|
| 6,151,595 | A | 11/2000 | Pirolli et al. |
| 6,181,343 | B1 | 1/2001 | Lyons |
| 6,195,104 | B1 | 2/2001 | Lyons |
| 6,249,606 | B1 | 6/2001 | Kiraly et al. |
| 6,269,172 | B1 | 7/2001 | Rehg et al. |
| 6,327,346 | B1 | 12/2001 | Infosino |
| 6,404,506 | B1 | 6/2002 | Cheng et al. |
| 6,469,633 | B1 | 10/2002 | Wachter |
| 6,499,026 | B1 | 12/2002 | Rivette et al. |
| 6,600,475 | B2 | 7/2003 | Gutta et al. |
| 6,624,833 | B1 | 9/2003 | Kumar et al. |
| 6,710,770 | B2 | 3/2004 | Tomasi et al. |
| 6,788,809 | B1 | 9/2004 | Grzeszczuk et al. |
| 6,804,396 | B2 | 10/2004 | Higaki et al. |
| 6,850,252 | B1 * | 2/2005 | Hoffberg ...................... 715/716 |
| 6,856,470 | B2 | 2/2005 | Nishimura |
| 6,888,960 | B2 | 5/2005 | Penev et al. |
| 6,907,581 | B2 | 6/2005 | Noy et al. |
| 6,920,619 | B1 | 7/2005 | Milekic |
| 6,982,697 | B2 | 1/2006 | Wilson |
| 6,990,639 | B2 | 1/2006 | Wilson |
| 6,998,987 | B2 | 2/2006 | Lin |
| 7,000,200 | B1 | 2/2006 | Martins |
| 7,007,236 | B2 | 2/2006 | Dempski et al. |
| 7,038,661 | B2 | 5/2006 | Wilson |
| 7,066,388 | B2 | 6/2006 | He |
| 7,068,842 | B2 | 6/2006 | Liang et al. |
| 7,095,401 | B2 | 8/2006 | Liu et al. |
| 7,096,454 | B2 | 8/2006 | Damm et al. |
| 7,123,770 | B2 | 10/2006 | Raghupathy et al. |
| 7,180,500 | B2 | 2/2007 | Marvit et al. |
| 7,202,791 | B2 | 4/2007 | Trajkovic |
| 7,301,526 | B2 | 11/2007 | Marvit et al. |
| 7,307,661 | B2 | 12/2007 | Lieberman et al. |
| 7,309,829 | B1 | 12/2007 | Ludwig |
| 7,333,090 | B2 | 2/2008 | Tanaka et al. |
| 7,355,632 | B2 | 4/2008 | Shiiyama |
| 7,365,736 | B2 | 4/2008 | Marvit et al. |
| 7,369,048 | B2 | 5/2008 | Freund |
| 7,372,977 | B2 | 5/2008 | Fujimura et al. |
| 7,372,993 | B2 | 5/2008 | Lagardere et al. |
| 7,427,980 | B1 | 9/2008 | Partridge et al. |
| 7,528,835 | B2 * | 5/2009 | Templeman .................. 345/474 |
| 7,564,369 | B1 | 7/2009 | Adams et al. |
| 7,565,295 | B1 | 7/2009 | Hernandez-Rebollar |
| 7,577,655 | B2 | 8/2009 | Curtiss et al. |
| 7,584,099 | B2 | 9/2009 | Ma et al. |
| 7,627,834 | B2 | 12/2009 | Rimas-Ribikauskas et al. |
| 7,697,960 | B2 * | 4/2010 | Seo et al. ...................... 455/566 |
| 7,870,496 | B1 | 1/2011 | Sherwani |
| 7,904,913 | B2 | 3/2011 | Sim-Tang et al. |
| 7,970,176 | B2 | 6/2011 | Kutliroff et al. |
| 8,147,248 | B2 | 4/2012 | Rimas-Ribikauskas et al. |
| 8,165,422 | B2 | 4/2012 | Wilson |
| 8,182,267 | B2 | 5/2012 | Katz et al. |
| 8,194,921 | B2 | 6/2012 | Kongqiao et al. |
| 8,214,387 | B2 | 7/2012 | King et al. |
| 2002/0034280 | A1 | 3/2002 | Infosino |
| 2002/0036617 | A1 | 3/2002 | Pryor |
| 2002/0061217 | A1 | 5/2002 | Hillman et al. |
| 2002/0118880 | A1 | 8/2002 | Liu et al. |
| 2003/0046689 | A1 * | 3/2003 | Gaos ............................... 725/34 |
| 2003/0059081 | A1 | 3/2003 | Trajkovic |
| 2003/0067537 | A1 | 4/2003 | Myers |
| 2003/0156756 | A1 | 8/2003 | Gokturk et al. |
| 2003/0193572 | A1 | 10/2003 | Wilson et al. |
| 2004/0001113 | A1 | 1/2004 | Zipperer et al. |
| 2004/0155902 | A1 | 8/2004 | Dempski et al. |
| 2004/0174542 | A1 | 9/2004 | Handman et al. |
| 2004/0189720 | A1 | 9/2004 | Wilson et al. |
| 2004/0193441 | A1 | 9/2004 | Altieri |
| 2004/0233172 | A1 | 11/2004 | Schneider et al. |
| 2005/0089204 | A1 | 4/2005 | Carver et al. |
| 2005/0151850 | A1 | 7/2005 | Ahn et al. |
| 2005/0181347 | A1 * | 8/2005 | Barnes et al. ................. 434/350 |
| 2005/0210417 | A1 | 9/2005 | Marvit et al. |
| 2005/0212751 | A1 | 9/2005 | Marvit et al. |
| 2005/0212753 | A1 | 9/2005 | Marvit et al. |
| 2005/0238201 | A1 | 10/2005 | Shamaie |
| 2005/0255434 | A1 | 11/2005 | Lok et al. |
| 2005/0281475 | A1 | 12/2005 | Wilson |
| 2006/0001650 | A1 | 1/2006 | Robbins et al. |
| 2006/0007142 | A1 | 1/2006 | Wilson et al. |
| 2006/0010400 | A1 | 1/2006 | Dehlin et al. |
| 2006/0026521 | A1 | 2/2006 | Hotelling et al. |
| 2006/0026536 | A1 | 2/2006 | Hotelling et al. |
| 2006/0027658 | A1 | 2/2006 | Genc et al. |
| 2006/0031786 | A1 | 2/2006 | Hillis et al. |
| 2006/0036944 | A1 | 2/2006 | Wilson |
| 2006/0041590 | A1 | 2/2006 | King et al. |
| 2006/0055684 | A1 | 3/2006 | Rimas-Ribikauskas et al. |
| 2006/0061545 | A1 | 3/2006 | Hughes et al. |
| 2006/0061814 | A1 | 3/2006 | Tokunaga |
| 2006/0092267 | A1 | 5/2006 | Dempski et al. |
| 2006/0097991 | A1 | 5/2006 | Hotelling et al. |
| 2006/0101384 | A1 | 5/2006 | Sim-Tang et al. |
| 2006/0125799 | A1 | 6/2006 | Hillis et al. |
| 2006/0125803 | A1 | 6/2006 | Westerman et al. |
| 2006/0128460 | A1 | 6/2006 | Muir et al. |
| 2006/0178212 | A1 | 8/2006 | Penzias |
| 2006/0210958 | A1 | 9/2006 | Rimas-Ribikauskas et al. |
| 2006/0223635 | A1 | 10/2006 | Rosenberg |
| 2006/0229862 | A1 | 10/2006 | Ma et al. |
| 2006/0244719 | A1 | 11/2006 | Brigham, II et al. |
| 2006/0250213 | A1 | 11/2006 | Cain, Jr. et al. |
| 2006/0256081 | A1 | 11/2006 | Zalewski et al. |
| 2006/0267966 | A1 | 11/2006 | Grossman et al. |
| 2007/0057793 | A1 | 3/2007 | Alden |
| 2007/0063991 | A1 | 3/2007 | Lee et al. |
| 2007/0082710 | A1 | 4/2007 | Jang |
| 2007/0109808 | A1 | 5/2007 | Hobden et al. |
| 2007/0177803 | A1 | 8/2007 | Elias et al. |
| 2007/0182818 | A1 | 8/2007 | Buehler |
| 2007/0192739 | A1 | 8/2007 | Hunleth et al. |
| 2007/0223015 | A1 | 9/2007 | Lapstun et al. |
| 2007/0238491 | A1 | 10/2007 | He |
| 2007/0251521 | A1 | 11/2007 | Schackmuth et al. |
| 2007/0252898 | A1 | 11/2007 | Delean |
| 2007/0283263 | A1 | 12/2007 | Zawde et al. |
| 2007/0283296 | A1 | 12/2007 | Nilsson |
| 2008/0005703 | A1 | 1/2008 | Radivojevic et al. |
| 2008/0028321 | A1 | 1/2008 | Weksler et al. |
| 2008/0029691 | A1 | 2/2008 | Han |
| 2008/0036732 | A1 | 2/2008 | Wilson et al. |
| 2008/0036743 | A1 | 2/2008 | Westerman et al. |
| 2008/0042978 | A1 | 2/2008 | Perez-Noguera |
| 2008/0094370 | A1 | 4/2008 | Ording et al. |
| 2008/0122786 | A1 | 5/2008 | Pryor et al. |
| 2008/0167960 | A1 | 7/2008 | Hughes |
| 2008/0168403 | A1 | 7/2008 | Westerman et al. |
| 2008/0170776 | A1 | 7/2008 | Albertson et al. |
| 2008/0178126 | A1 | 7/2008 | Beeck et al. |
| 2008/0179507 | A2 | 7/2008 | Han |
| 2008/0191864 | A1 | 8/2008 | Wolfson |
| 2008/0193043 | A1 | 8/2008 | Wilson |
| 2008/0244468 | A1 | 10/2008 | Nishihara et al. |
| 2008/0250314 | A1 | 10/2008 | Larsen |
| 2008/0252596 | A1 | 10/2008 | Bell et al. |
| 2008/0254426 | A1 | 10/2008 | Cohen |
| 2009/0049089 | A1 | 2/2009 | Adachi et al. |
| 2009/0121894 | A1 | 5/2009 | Wilson et al. |
| 2009/0257649 | A1 | 10/2009 | Yamauchi et al. |
| 2009/0278799 | A1 | 11/2009 | Wilson |
| 2009/0278806 | A1 | 11/2009 | Duarte et al. |
| 2009/0306983 | A1 | 12/2009 | Bhandari |
| 2009/0307623 | A1 | 12/2009 | Agarawala et al. |
| 2009/0324008 | A1 | 12/2009 | Kongqiao et al. |
| 2010/0031202 | A1 | 2/2010 | Morris et al. |
| 2010/0103269 | A1 | 4/2010 | Wilson et al. |
| 2010/0207874 | A1 | 8/2010 | Yuxin et al. |
| 2011/0019056 | A1 | 1/2011 | Hirsch et al. |
| 2011/0137900 | A1 | 6/2011 | Chang et al. |

(56) References Cited

U.S. PATENT DOCUMENTS

| | | | |
|---|---|---|---|
| 2011/0263946 A1 | 10/2011 | el Kaliouby et al. | |
| 2011/0282785 A1 | 11/2011 | Chin | |
| 2012/0150651 A1 | 6/2012 | Hoffberg et al. | |

FOREIGN PATENT DOCUMENTS

| | | | |
|---|---|---|---|
| JP | 2001109579 | A | 4/2001 |
| JP | 2001159865 | | 6/2001 |
| JP | 2002251235 | | 9/2002 |
| JP | 2003005913 | | 1/2003 |
| JP | 2003281652 | | 10/2003 |
| JP | 2006163751 | | 6/2006 |
| JP | 2006518076 | | 8/2006 |
| JP | 2009525538 | | 7/2009 |
| WO | WO0216865 | A2 | 2/2002 |
| WO | WO03063069 | A2 | 7/2003 |
| WO | WO2004072843 | A1 | 8/2004 |
| WO | WO2005064275 | | 7/2005 |
| WO | WO2005087460 | A1 | 9/2005 |
| WO | WO2005114369 | A2 | 12/2005 |
| WO | WO2007089766 | A2 | 8/2007 |

OTHER PUBLICATIONS

Office Action for U.S. Appl. No. 12/425,405, mailed on Jul. 20, 2011, Andrew D. Wilson, “Magic Wand”, 11 pgs.

“Office Assistant”, Wikipedia Free Encyclopedia, Nov. 1, 2006, 2 pgs.

“Eye Toy”, Wikipedia, Oct. 25, 2007, Retrieved on Jan. 13, 2012 at http://en.wikipedia.org/w/index.php?title=EyeToy&oldid=166687900>> 5 pgs.

Office Action for U.S. Appl. No. 12/425,405, mailed on Jan. 23, 2012, Andrew D. Wilson, “Magic Wand”, 11 pgs.

Office Action for U.S. Appl. No. 12/118,955, mailed on Oct. 25, 2011, Andrew D. Wilson, “Computer vision-based multi-touch sensing using infrared lasers”,13 pgs.

Office Action for U.S. Appl. No. 12/185,166, mailed on Oct. 27, 2011, Meredith June Morris, “User-Defined Gesture Set for Surface Computing”, 28 pgs.

Office Action for U.S. Appl. No. 12/490,335, mailed on Dec. 15, 2011, Meredith June Morris, “User-Defined Gesture Set for Surface Computing”, 232pgs.

Rubine, “Specifying Gestures by Example”, ACM, In the Proceedings of the 18th Annual Conference on Computer Graphics and Interactive Techniques, vol. 25, Issue 4, Jul. 1991, pp. 329-337.

The Extended European Search Report mailed Mar. 16, 2012 for European patent application No. 09747057.9, 8 pages.

Office Action for U.S. Appl. No. 12/490,335, mailed on Apr. 12, 2012, Meredith J. Morris, “User-Defined Gesture Set for Surface Computing”, 28 pgs.

Office Action for U.S. Appl. No. 12/185,166, mailed on Apr. 13, 2012, Meredith J. Morris, “User-Defined Gesture Set for Surface Computing”, 34 pgs.

Boukraa, et al., “Tag-Based Vision: Assisting 3D Scene Analysis with Radio-Frequency Tags”, Proc Fifth Intl Conf on Information Fusion, Jul. 2002, pp. 412-418.

Cerrada, et al., “Fusion of 3D Vision Techniques and RFID Technology for Object Recognition in Complex Scenes”, IEEE Intl Symposium on Intelligent Signal Processing, Oct. 2007, 6 pages.

“Continuous Change is a Way of Living”, Philips Research Techonology Magazine, Issue 26, Feb. 2006, etrieved from <<http://www/research.philips.com/password/archive/26/pw26-editorial.html>>, 2 pages.

Fishkin, et al., “I Sense a Disturbance in the Force: Unobtrusive Detection of Interactions with RFID-tagged Objects”, Intel Research Seattle Tech Memo, Jun. 2004, 17 pages.

Ishii, et al., “Tangible Bits: Towards Seamless Interfaces between People, Bits and Atoms”, In Proceedings of CHI’97, Mar. 22-27, 1997, 8 pages.

Krahnstoever, et al., “Activity Recognition using Visual Tracking and RFID”, In Proceedings of the Seventh IEEE Workshop on Applications of Computer Vision, Jan. 2005, 7 pages.

Lee, et al., “Object Tracking Based on RFID Coverage Visual Compensation in Wireless Sensor Network”, IEEE Intl Symposium on Circuits and Systems, May 2007, 4 pages.

“Microsoft Surface”, retrieved at <<http://www.microsoft.com/surfact/>>Last accessed Jun. 30, 2008, 1 page.

Nakagawa, et al., “Image Systems Using RFID Tag Positioning Information”, In NTT Technical Review, vol. 1 No. 7, Oct. 2003, 5 pages.

Office Action for U.S. Appl. No. 12/185,174, mailed on Aug. 22, 2011, Andrew D. Wilson, “Fusing RFID and Vision for Surface Object Tracking”, 43 pgs.

Office Action for U.S. Appl. No. 12/185,174, mailed on Jan. 30, 2012, Andrew D. Wilson, “Fusing RFID and Vision for Surface Object Tracking”, 45 pgs.

Office action for U.S. Appl. No. 12/118,955, mailed on Jun. 21, 2012, Wilson, “Computer Vision-based Multi-Touch Sensing Using Infrared Lasers”, 21 pages.

Olwal, “LightSense: Enabling Spatially Aware Handheld Interaction Devices”, In Proceedings of ISMAR 2006 (IEEE and ACM International Symposium on Mixed and Augmented Reality), Santa Barbara, CA, Oct. 22-25, 2006, pp. 119-112, 4 pages.

Patten, et al., “Sensetable: A Wireless Object Tracking Platform for Tangible User Interfaces”, In Proceedings of CHI 2001, Mar. 31-Apr. 5, 2001, 8 pages.

Rahimi, et al., “Estimating Observation Functions in Dynamical Systems using Unsupervised Regression”, Sep. 19, 2006, Neural Information Processing Systems Foundation (NIPS), 9 pages.

Raskar, et al., “Photosensing Wireless Tags for Geometic Procedures”, Sep. 2005, vol. 48, No. 9, Communications of the ACM, 46-51, 6 pages.

Reilly, et al., “Marked-up Maps: Combining Paper Maps and Electronic Information Resources” In: Personal and Ubiquitous Computing, vol. 10, Issue 4 (Mar. 2006). pp. 215-226, 12 pages.

Rekimoto, et al., “Augmented Surfaces: A Spatially Continuous Work Space for Hybrid Computing Environments”, In Proceedings SIGGCHI Conf on Human Factors in Computing Systems, May 15-20, 1999, 8 pages.

Rekimoto, et al., “DataTiles: A Modular Platform for Mixed Physical and Graphical Interactions”, SIGCHI’01, Mar. 31-Apr. 4, 2001, 8 pages.

Sugimoto, et al., “Supporting Face-to-face Group Activities with a Sensor-Embedded Board”, Proc ACM CSCW 2000 Workshop on Shared Environments to Support Face to Face Collaboration, Dec. 2000, 4 pages.

Ullmer, et al., “mediaBlocks: Physical Containers, Transports, and Controls for Online Media”, In Computer Graphics Proceedings (SIGGRAPH’98), Jul. 19-24, 1998, 8 pages.

Ullmer, et al., “Tangible Query Interfaces: Physically Constrained Tokens for Manipulating Databases Queries”, Proc INTERACT’03, Sep. 2003, 8 pages.

Ullmer, et al., “The metaDESK: Models and Prototypes for Tangible User Interfaces”, In Proceedings of UIST’97, Oct. 14-17, 1997, 10 pages.

Want, et al., “Bridging Physical and Virtual Worlds with Electronic Tags”, In Proceedings of CHI’99, ACM Press, Apr. 1999, 8 pages.

Wilson, “BlueTable: ConnectingWireless Mobile Devices on Interactive Surfaces Using Vision-Based Handshaking”, Proc Graphics Interface 2007, 7 pages.

Woolls-King, et al., “Making Electronic Games More Sociable”, Philips Research Technology Magazine, Issue 26, Feb. 2006, 2 pages.

Chinese Office Action mailed Aug. 21, 2012 for Chinese patent application No. 200980117593.7, a counterpart foreign application of U.S. Appl. No. 12/118,955, 15 pages.

Harwig, “Continuous Change is a Way of living,” Password: Philips Reasearch Technology magazine, issue 26, Feb. 2006, pp. 2-3 (+ cover).

Office action for U.S. Appl. No. 12/185,166, mailed on Sep. 7, 2012, Morris et al., “User-Defined Gesture Set for Surface Computing,” 34 pages.

(56) References Cited

OTHER PUBLICATIONS

Wikipedia, "Eye Toy," Wikipedia, retrieved on Jan. 13, 2012 at <<http://en.wikipedia.org/w/index.php? title=EyeToy&oldid=166687900>>, 5 pages.

Chinese Office Action mailed Nov. 2, 2012 for Chinese patent application No. 200980130773.9, a countpерpart foreign application of U.S. Appl. No. 12/185,166, 16 pages.

Chinese Office Action mailed Mar. 12, 2013 for Chinese patent application No., a counterpart foreign application of U.S. Appl. No. 12/118,955, 12 pages.

Chinese Office Action mailed Jul. 11, 2013 for Chinese patent application No. 200980117593.7, a counterpart foreign application of U.S. Appl. No. 12/118,955, 12 pages.

Chinese Office Action mailed Jul. 4, 2013 for Chinese patent application No. 200980130773.9, a counterpart foreign application of U.S. Appl. No. 12/185,166, 6 pages.

Japanese Office Action mailed May 28, 2013 for Japanese patent application No. 2011-509511, a counterpart foreign application of U.S. Appl. No. 12/118,955, 6 pages.

Office action for U.S. Appl. No. 12/490,335, mailed on Feb. 1, 2013, Morris et al., "User-Defined Gesture Set for Surface Computing", 30 pages.

Office action for U.S. Appl. No. 12/185,174, mailed on Jan. 22, 2013, Wilson et al., "Fusing RFID and Vision for Surface Object Tracking", 47 pages.

Office action for U.S. Appl. No. 12/118,955, mailed on Jan. 23, 2013, Wilson et al, "Computer Vision-based Multi-Touch Sensing Using Infrared Lasers", 21 pages.

Office action for U.S. Appl. No. 12/490,335, mailed on May 10, 2013, Morris et al., "User-Defined Gesture Set for Surface Computing", 34 pages.

Office action for U.S. Appl. No. 12/185,166, mailed on Jun. 25, 2013, Morris et al., "User-Defined Gesture Set for Surface Computing", 37 pages.

Office action for U.S. Appl. No. 12/118,955, mailed on Jun. 6, 2013, Wilson, "Computer Vision-based Multi-Touch Sensing Using Infrared Lasers", 13 pages.

Office action for U.S. Appl. No. 12/185,174, mailed on Jul. 9, 2013, Wilson et al., "Fusing RFID and Vision for Surface Object Tracking", 41 pages.

Wikipedia, "The Wisdom of Crowds", at http://web.archive.org/web/20071228204455/http://en.wikipedia.org/wiki/, retrieved on Nov. 27, 2012, 2007, 8 pages.

Avrahami, et al., "Guided Gesture Support in the Paper PDA" Submitted to UIST '01. <<http://chromaticgray.com/cv/PaperPDA.pdf>> Last accessed Jun. 9, 2008, 2 pages.

Beringer, "Evoking Gestures in SmartKom—Design of the Graphical User Interface" <<http://www.techfak.uni-bielefeld.de/ags/wbski/gw2001book/draftpapers/sv-beringer_37.pdf>> Last accessed Jun. 9, 2008, 12 pages.

Buxton, "Lexical and Pragmatic Considerations of Input Structures", In Computer Graphics, 17(1), 31-37, 1983 <<http://www.billbuxton.com/lexical.html>> Last accessed Jun. 9, 2008, 11 pages.

Cassell, "A Framework for Gesture Generation and Interpretation", In Computer Vision in Human-Machine Interaction, R. Cipolla and A. Pentland, eds. <<http://citeseer.ist.psu.edu/cache/papers/cs/2011/http:zSzzSzgn.www.media.mit.eduzSzgroupszSzgnzSzpublicationszSzgesture_wkshop.pdf/a-framework-for-gesture.pdf>> Last accessed Jun. 6, 2008, 19 pages.

Dietz, et al., "Diamond Touch: A Multi-User Touch Technology", In UIST'01, Orlando, FL <<http://delivery.acm.org/10.1145/510000/502389/p219-dietz.pdf?key1=502389&key2=0452892121&coll=GUIDE&dl=GUIDE&CFID=72023659&CFTOKEN=10869625>> Last accessed Jun. 9, 2008, 8 pages.

Epps, et al., "A Study of Hand Shape Use in Tabletop Gesture Interaction" In CHI 2006, Apr. 22-27, 2006. Montreal, Quebec, Canada. ACM 1-59593-298-4/06/004. <<http://delivery.acm.org/10.1145/1130000/1125601/p748-epps.pdf?key1=1125601&key2=4072892121&coll=GUIDE&dl=GUIDE&CFID=72023941&CFTOKEN=75878795>>Last accessed Jun. 9, 2008, 6 pages.

Forlines, et al., "Multi-User, Multi-Display Interaction with a Single-User, Single-Display Geospatial Application", In UIST'06, Oct. 15-18, 2006, Montreux, Switzerland. ACM 1-59593-313-1/06/0010 <<http://www.dgp.toronto.edu/~dwigdor/research/forlines_uist_2006.pdf>>Last accessed Jun. 9, 2008, 4 pages.

Furnas, et al., "The Vocabulary Problem in Human-System Communication", In Communications of the ACM, Nov. 1987, vol. 30, No. 11. <<http://delivery.acm.org/10.1145/40000/32212/p964-furnas.pdf?key1=32212&key2=7992892121&coll=GUIDE&dl=GUIDE&CFID=72024403&CFTOKEN=86325593>>Last accessed Jun. 9, 2008, 8 pages.

Good, et al., "Building a User-Derived Interface", Research Contributions, Human Aspects of Computing, Communications of the ACM, vol. 27, No. 10, Oct. 1984. <<http://delivery.acm.org/10.1145/360000/358284/p1032-good.pdf?key1=358284&key2=3603892121&coll=GUIDE&dl=GUIDE&CFID=72024489&CFTOKEN=70249236>>Last accessed Jun. 9, 2008, 12 pages.

Hutchins, et al., "Direct Manipulation Interfaces", In Human-Computer Interaction, 1985, vol. 1, 311-338 <<http://hci.ucsd.edu/120/direct-manip.pdf>>Last accessed Jun. 9, 2008, 28 pages.

Japanese Office Action mailed Sep. 24, 2013 for Japanese patent application No. 2011-522105, a counterpart foreign application of U.S. Appl. No. 12/185,166, 4 pages.

Liu, et al., "TNT: Improved Rotation and Translation on Digital Tables", In: Graphics Interface 2006. <<http//delivery.acm.org/10.1145/1150000/1143084/p25-liu.pdf?key1=1143084&key2=9243892121&coll=GUIDE&dl=GUIDE%CFID=31373040&CFTOKEN=93238135>>Last accessed Jun. 9, 2008, 8 pages.

Long, et al., "Implications For Gesture Design Tool", In CHI'99, Pittsburgh, PA, USA <<http://delivery.acm.org/10.1145/310000/302985/p40-long.pdf?key1=302985&key2=0153892121&coll=portal&dl=ACM&CFID=72025099&CFTOKEN=39528770>> Last accessed Jun. 9, 2008, 8 pages.

Maas. Vision Systems, http://www.vision-systems.com/display_article/285207/19/ARTCL/none/none/3-D-system-profiles-highway-surfaces/. Last accessed Apr. 30, 2008, 4 pages.

Malik, et al., "Interacting with Large Displays from a Distance with Vision-Tracked Multi-Finger Gestural Input", In UIST'05, Oct. 23-27, 2005, Seattle, Washington, USA. ACM 1-59593-023-X/05/0010 <<http://delivery.acm.org/10.1145/1100000/1095042/p43-malik.pdf?key1=1095042&key2=0063892121&coll=GUIDE&dl=GUIDE&CFID=72025262&CFTOKEN=45252059>> Last accessed Jun. 9, 2008, 10 pages.

Mignot, et al., "An Experimental Study of Future 'Natural' Multimodal Human-Computer Interaction" <<http://delivery.acm.org/10.1145/270000/260075/p67-mignot.pdf?key1=260075&key2=1573892121&coll=GUIDE&dI=ACM&CFID=72025485&CFTOKEN=29812262>> Last accessed Jun. 9, 2008, 2 pages.

Morris, et al., "Cooperative Gestures: Multi-User Gestural Interactions for Co-located Groupware", CHI 2006, Apr. 22-28, 2006, Montreal, Quebec, Canada. ACM 1-59593-178-3/06/0004 <<http://research.microsoft.com/~merrie/papers/coopgest.pdf>> Last accessed Jun. 9, 2008, 10 pages.

Morris, "Supporting Effective Interaction with Tabletop Groupware" <<http://hci.stanford.edu/publication/2006/ieee_workshop.pdf>>> Last accessed Jun. 9, 2008, 2 pages.

Morris, et al., "User Defined Gesture Set for Surface computing", Application Filed on Aug. 4, 2008, U.S. Appl. No. 12/185,166.

Moscovich, et al., "Multi-finger Cursor Techniques" <<http://www.dgp.toronto.edu/~tomer/store/papers/multifcursors-gi2006.pdf>> Last accessed Jun. 9, 2008, 7 pages.

Nielsen, et al., "A procedure for developing intuitive and ergonomic gesture interfaces for HCI" <<http://www.vision.auc.dk/~tbm/Publication/gw03.pdf>> Last accessed Jun. 9, 2008, 16 pages.

Office action for U.S. Appl. No. 12/490,335, mailed on Oct. 31, 2013, Morris, et al., "User-Defined Gesture Set for Surface Computing", 35 pages.

Office action for U.S. Appl. No. 12/185,166, mailed on Nov. 13, 2013, Morris, et al., "User-Defined Gesture Set for Surface Computing", 40 pages.

(56) References Cited

OTHER PUBLICATIONS

Wilson, "PlayAnywhere: A Compact Interactive Tabletop Projection-Vision System." UIST'05, Oct. 23-27, 2005, Seattle, Washington, USA. ACM 1-59593-023-X/05/0010. <<http://research.microsoft.com/~awilson/papers/wilson%20playanywhere%20uist%20205.pdf>> Last accesed Jun. 9, 2008, 10 pages.

Wobbrock, et al., "Maximizing the Guessability of Symbolic Input", CHI 2005, Apr. 2-7, 2005, Portland, Oregon, USA. ACM 1-59593-002-7/05/0004. <<http://delivery.acm.org/10.1145/1060000/1057043/p1869-wobbrock.pdf?key1=1057043&key2=5715892121&coll=GUIDE&dl=GUIDE&CFID=31375304&CFTOKEN=90405114> Last accessed Jun. 9, 2008, 4 pages.

Wu, et al., "Gesture Registration, Relaxation, and Reuse for Multi-Point Direct-Touch Surfaces", Proceedings of the First IEEE International Workshop on Horizontal Interactive Human-Computer Systems (TABLETOP '06) <<http://ieeexplore.ieee.org/iel5/10546/33359/01579211.pdf?isnumber=33359&prod=CNF&amumber=1579211&arSt=+8+pp.&ared=&arAuthor=Wu%2C+M.%3B+Chia+Shen%3B+Ryall%2C+K.%B+ForlinesBalakrishnan%2C+C+3B+Ba;alrosjmam%2C+R>> Last accessed Jun. 9, 2008, 8 pages.

Wu, et al., "Multi-Finger and Whole Hand Gestural Interaction Techniques for Multi-User Tabletop Displays", retrieved on Aug. 29, 2013 at <<http://dl.acm.org/citation.cfm?id=964718>>, ACM Digital Library, 2003, 12 pages.

Chinese Office Action mailed Jan. 8, 2013 for Chinese patent application No. 200980130773.9, a counterpart foreign application of U.S. Appl. No. 12/185,166, 13 pages.

Office action for U.S. Appl. No. 12/425,405, mailed on Mar. 11, 2014, Wilson et al., "Magic Wand", 20 pages.

Office action for U.S. Appl. No. 12/425,405, mailed on Aug. 12, 2014, Wilson et al., "Magic Wand", 23 pages.

Chinese Office Action mailed Jul. 21, 2014 for Chinese patent application No. 200980130773.9, a counterpart foreign application of U.S. Appl. No. 12/185,166, 7 pages.

Japanese Office Action mailed Jun. 3, 2014 for Japanese patent application No. 2011-522105, a counterpart foreign application of U.S. Appl. No. 12/185,166, 15 pages.

Kjeldsen, "Polar Touch Detection", retrieved on Apr. 21, 2014 at <<ftp://ool-45795253.dyn.optonline.net/FantomHD/Manual%20backups/IBM%20Laptop/12-5-2012/Rick%20Second%Try/Gesture/PAPERS/UIST%20'06/Polar%20Touch%20Buttons%20Submit%20Spelling.pdf>>, 2007, 10 pages.

Final Office Action for U.S. Appl. No. 12/490,335, mailed on May 7, 2014, Meredith J. Morris, "User-Defined Gesture Set for Surface Computing", 57 pages.

Kjeldsen, "Polar Touch Detection", retrieved on Apr. 21, 2014 at <<ftp://ool-45795253.dyn.optonline.net/FantomHD/Manual%20backups/IBM%20Laptop/12-05-2012/Rick%20Second%Try/Gesture/PAPERS/UIST%20'06/Polar%20Touch%20Buttons%20Submit%20Spelling.pdf>>, 2007, 10 pages.

Chinese Office Action mailed Feb. 3, 2015 for Chinese patent application No. 200980130773.9, a counterpart foreign application of U.S. Appl. No. 12/185,166, 13 pages.

* cited by examiner

MAGIC WAND

CROSS-REFERENCE TO RELATED APPLICATIONS

This application is related to U.S. application Ser. No. 11/767,733, filed on Jun. 6, 2007, entitled "AUTOMATIC CONFIGURATION OF DEVICES BASED ON BIOMETRIC DATA." The entirety of this application is incorporated herein by reference.

BACKGROUND

There has long been an imaginative current flowing in popular culture relating to magic, which has recently culminated in the Harry Potter phenomenon. Given the widespread commercial success of Harry Potter books and feature films, as well the many predecessors in the fantasy genre such as The Lord of the Rings, Dungeons and Dragons, etc., it is readily apparent that a number of communities or demographic segments are enamored with the idea of magic. Discounting the aforementioned communities, even the most pragmatic individual would have trouble arguing against the merits or utility of, say, a magic wand that actually worked to control or communicate with objects or components in an associated nearby environment.

Conventionally, a number of devices exist that are intended to operate or control objects in the environment, even some that are specifically intended to leverage, simulate, or promote the appearance of magic. However, systems or devices in this technological area as well as even much broader market segments aimed at, say, consumer devices in general often suffer from a variety of difficulties that stem from two market-driving factors that are distinct and sometimes at odds with one another. In particular, consumers want devices that have a very rich feature set. On the other hand, consumers also want devices that are small, convenient (e.g., to carry), and easy to use.

Miniaturization of electronic devices has reached the point where significant computing power can be delivered in devices smaller than a matchbook. Hence, miniaturization is no longer the primary technological bottleneck for meeting the demands of consumers. Rather, the challenges are increasingly leaning toward the user interface of such devices. For example, technology exists for building a full-featured cellular phone (or other device) that is no larger than a given user's thumb, yet packing a keypad and display in such a device is all but impossible. Even devices that are not so small, but desire to provide multifunctional features can suffer from a related difficulty. In particular, packing a lot of features into a single device generally increases the complexity of use.

To avoid such difficulties, conventional devices that are intended to operate or control numerous environmental components simplify the user-interface, which reduces the feature set; or have highly complex operational requirements that make the device very difficult to use.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can facilitate rich interaction with and/or management of environmental components included in an environment. At least a portion of the architecture can be included in a housing that can be referred to as (and can but need not resemble) a wand. The architecture can include a variety of J/O components such as keys/keypad, navigation buttons, lights, switches, displays, speakers, microphones, transmitters/receives, or substantially any other suitable component found in or related to conventional user-interfaces.

The architecture can also include or be operatively coupled to a set of sensors such as accelerometers, gyroscopes, cameras, range-finders, biometric sensors and so on. One or more sensor can be utilized to determine an orientation of the wand, wherein the orientation can relate to or include the position of the wand, the direction of focus of the wand (or a targeted environmental component) as well as a gesture or recent trajectory of the wand. Based upon the orientation of the wand, the architecture can determine a suitable instruction, which can be transmitted to the targeted environmental component and result in a change in the state of the targeted environmental component.

In addition, to, e.g. provide very rich features without necessarily scaling up the size or complexity of the user interface in proportion, the architecture can provide an advisor component that can be configured to provide guidance in connection with the orientation or other suitable aspects. The advisor component can present the guidance to a user of the wand in the form of an avatar, that can be updatable, configurable, and/or selectable and can in some cases control or relate to the set of available features.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
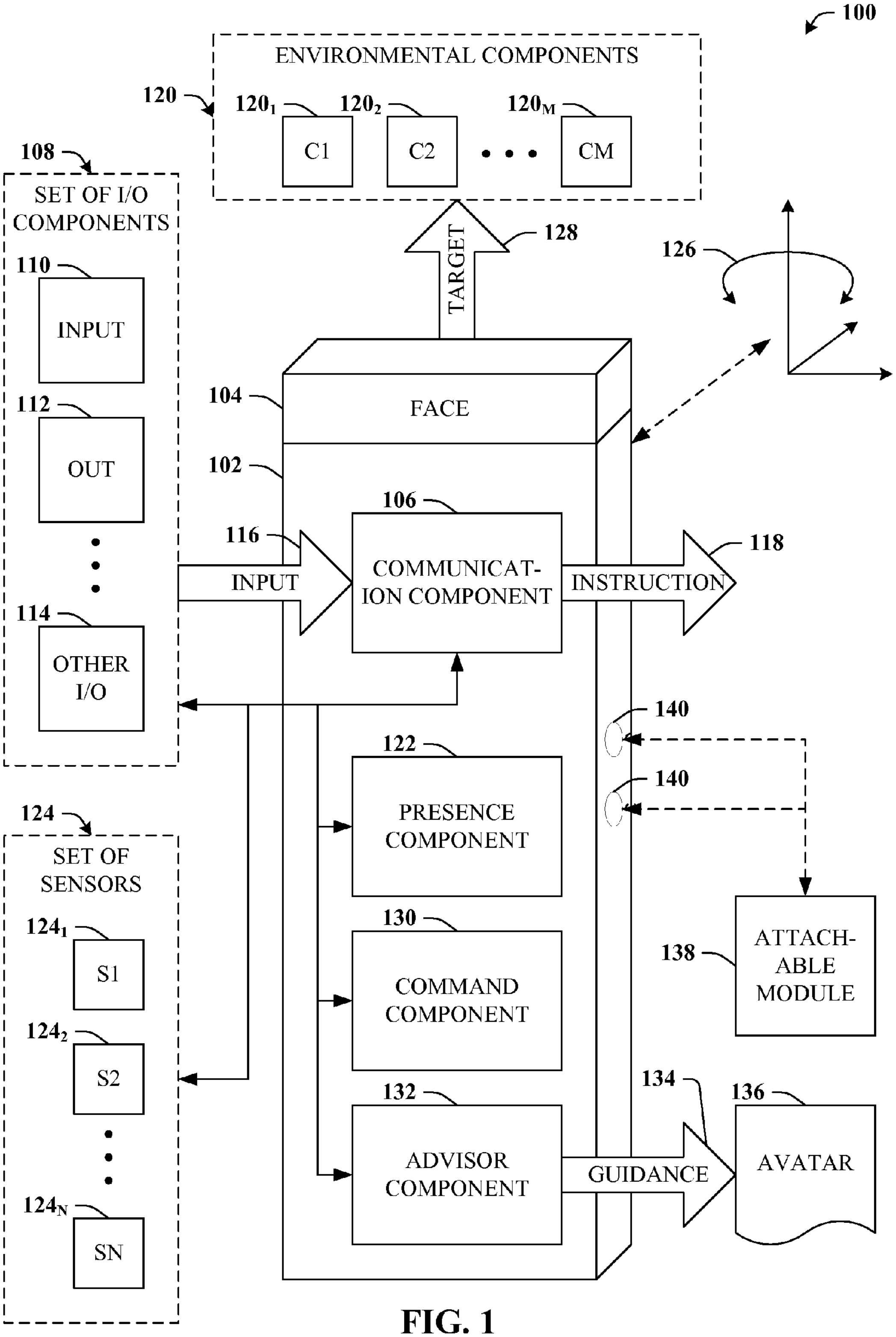
FIG. 1 illustrates a block diagram of a system that can facilitate rich interaction with and/or management of environmental components included in an environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms “component,” “module,” “system,” or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term “article of manufacture” as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion. As used in this application, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

As used herein, the terms “infer” or “inference” generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, system 100 that can facilitate rich interaction with and/or management of environmental components included in an environment is depicted. Generally, system 100 can include housing 102, which can be comprised of substantially any suitable material and can be substantially any suitable shape or design. Housing 102 can be shaped to resemble a wand, a remote control, a fob, etc. and is generally intended to be a handheld object. Housing 102 can include any suitable ergonomic or aesthetic feature as well as face 104 that can represent a designated side or salient feature of housing 102 that can be indicative of pointing to or targeting objects. In accordance therewith, housing 102 can include a pointing aid or reference such as a laser or LED pointing mechanism. It is to be appreciated that all or portions of components described herein can be included internally or mounted upon housing 102. However, such need not be the case in all situations as in certain cases some components can be and, in fact, might be required to be disparate from housing 102.

System 100 can also include communication component 106 that can manage set 108 of I/O components, which can include input component 110, output component 112 as well as substantially any number of individual I/O component(s) 114. It should be noted that input component 110 and output component 112 are distinguished from other I/O components 114 merely as a matter of form to provide more explicit references to these individual components. Set 108 of I/O components will typically reside within or upon housing 102, however, in some cases will be remote from housing 102. A variety of example components from set 108 of I/O components are provided in connection with FIG. 2, which can be referenced briefly along side FIG. 1 to provide concrete examples, but not necessarily to limit the scope of the claimed subject matter.

Figure 2:
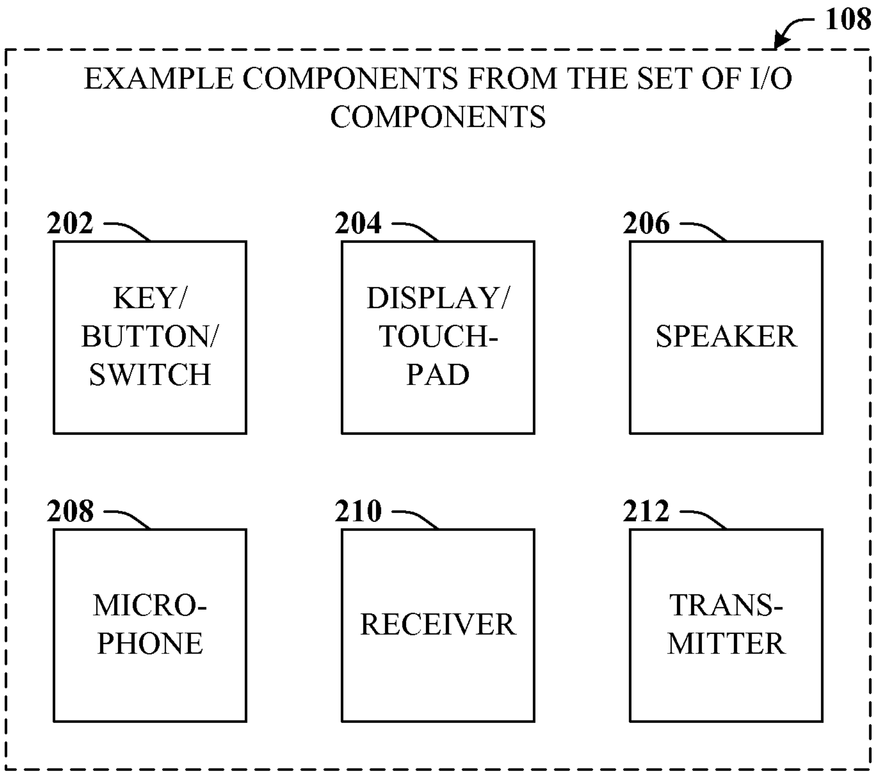
FIG. 2 illustrates a block diagram of various examples of components from set 108.

Turning now to FIG. 2, various examples of components from set 108 are expressly illustrated. As a first example, denoted by reference numeral 202, set 108 of I/O components can include a key, a button, a switch, a keypad, a keyboard or the like. Such component(s) 202 are usually included with or features of housing 102 and will typically be input component(s) 110, but can in some cases be or have aspects associated with output component 112 such as in the case where, e.g., key 202 has an associated light or LED to, e.g., indicate when key 202 is depressed. Another example from set 108 can be display 204. Display 204 can be substantially any suitable form factor and can provide one or both textual or graphical output. Display 204 can also be included with housing 102 and will often be an output device 112, but can have features of input device 110 such as in the case of a display that is responsive to touch or optical input (e.g., from a lightpen).

Other example components of set 108 can include speaker 206 that can provide audio outputs or microphone 208 that can receive audio inputs. Speaker 206 and microphone 208 can be included in housing 102, but can in some cases be remote from housing 102 such as part of a headset or other wearable device (not shown), potentially worn by a possessor of housing 102. In addition, set 108 can also include receiver 210 or transmitter 212 that can be, respectively, configured to receive or to transmit data or signals in one or more suitable protocols or formats, including but not limited to Near Field Communication (NFC), WiFi (IEEE 802.11x specifications), Bluetooth (IEEE 802.15.x specifications), Radio Frequency Identification (RFID), infrared, Universal Serial Bus (USB), FireWire (IEEE 1394 specification), etc.

Resuming the discussion of FIG. 1, the communication component 106 can be configured to receive input 116 by way of input component 110 (e.g. key 202, microphone 208, receiver 210) and to transmit instruction 118 by way of output component 112 (e.g., transmitter 212). Instruction 118 can be configured to update a state of one or more environmental component(s) $\mathbf{120}_1$-$\mathbf{120}_M$, wherein the one or more environmental component(s) $\mathbf{120}_1$-$\mathbf{120}_M$ can be configured to receive instruction 118 and to update the state in accordance with instruction 118. It should be understood that environmental component(s) $\mathbf{120}_1$-$\mathbf{120}_M$ can include substantially any number, M, of suitable components and/or devices in an environment, wherein the environment can be defined as an area, room, or space. In certain cases, the environment can be limited to an area within a certain range of housing 102, wherein the range can be predetermined, predefined, ad hoc, and/or based upon a particular wireless protocol, standard, or format. Additionally or alternatively, the environment or range can be based upon bounds of a geometric model or a locale or a range of other components/devices described herein (see e.g. FIG. 6). It should be appreciated that environment components $\mathbf{120}_1$-$\mathbf{120}_M$ can be referred to collectively or individually by environment component(s) 120, even though each environment component 120 can have unique or distinguishing features that differentiate from other environmental components 120. Numerous examples of suitable environmental components 120 can be found with reference to FIG. 3.

Figure 3:
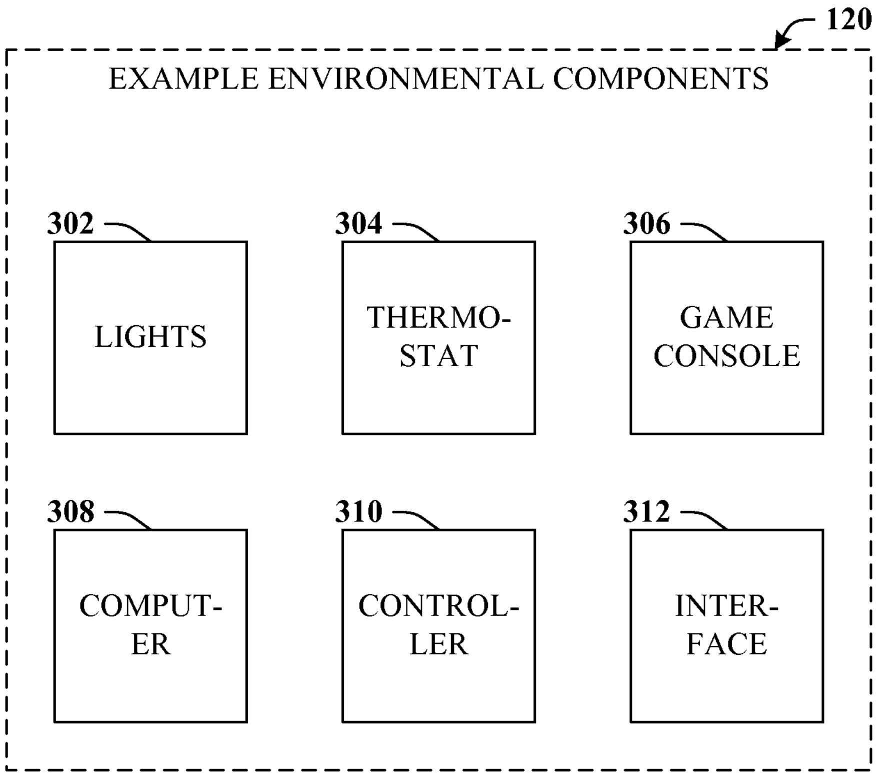
FIG. 3 depicts a block diagram of a variety of example environmental components 120.

While still referring to FIG. 1, but referring as well to FIG. 3, a variety of example environmental components 120 are illustrated in order to provide concrete examples, but not necessarily to limit the scope of the appended claims. In accordance therewith, examples of environmental component 120 can include lights 302, wherein instruction 118 can be a command to turn lights 302 on/off, dim/brighten lights 302, change the color/frequency of lights 302, change a timer setting, and so forth. Another example, environmental component 120 can be thermostat 304. Instruction 118 directed to thermostat 304 can be, e.g. a command to raise/lower a temperature or other setting or preference, a command to switch on a fan/heater/heat pump/air conditioner, etc.

Additionally, game console 306 or computer 308 can be examples of environmental components 120, as can components of or associated in some fashion with game console 306 or computer 308 such as computer-based controllers (e.g., controller 310) or a user-interface (e.g. interface 310). In one aspect, housing 102 (or associated components) can simulate, supplement, and/or supplant an existing game controller for game console 306. Likewise, housing 102 can provide additional inputs to computer 308 such as operating a mouse input or cursor. It is to be appreciated that in some cases, the foregoing might require special components to be present on console 306 or computer 308 such as, e.g. controller/interface 310. However in other situations, such need not necessarily be the case, which is described in additional detail infra.

In addition, example environmental component 120 can include aspects of systems (e.g., system 100) described herein (e.g., housing 102 and associated components or "wand") as well as similar devices as indicated by reference numeral 312. For example, it is noteworthy to mention that device 312 exists in the environment (and often is a basis for defining the environment), and such can be considered for many purposes of this disclosure to be one of environmental components 120. Moreover, instruction 118 can facilitate opening a communication session with other similar devices 312. Hence, the wand can communicate in a manner similar to a cellular phone or walkie-talkie with other wands. In addition a variety of other types of information can be exchanged between two wands such as, e.g., messages, media, codes, or substantially any other suitable content/data.

Continuing the discussion of FIG. 1, system 100 can further include presence component 122 that can employ set 124 of sensors $\mathbf{124}_1$-$\mathbf{124}_N$ (referred to herein either collectively or individually as sensor(s) 124, while appreciating that each sensor 124 can have traits that materially distinguish from other sensors 124). In particular, one or more sensor(s) 124 can be employed to, inter alia, determine orientation 126 of housing 102. However, it should be appreciated that set 124 can include one or more sensor(s) 124 that do not relate to orientation 126, but relate instead to, e.g. acquisition or determination of other suitable data. It should be understood that presence component 122 or another component described herein can also employ all or potions of sensors 124, even those that do not directly relate to orientation 126. Examples of both types of sensor 124 can be found with reference to FIG. 4, which can be referenced in tandem with FIG. 1.

Figure 4:
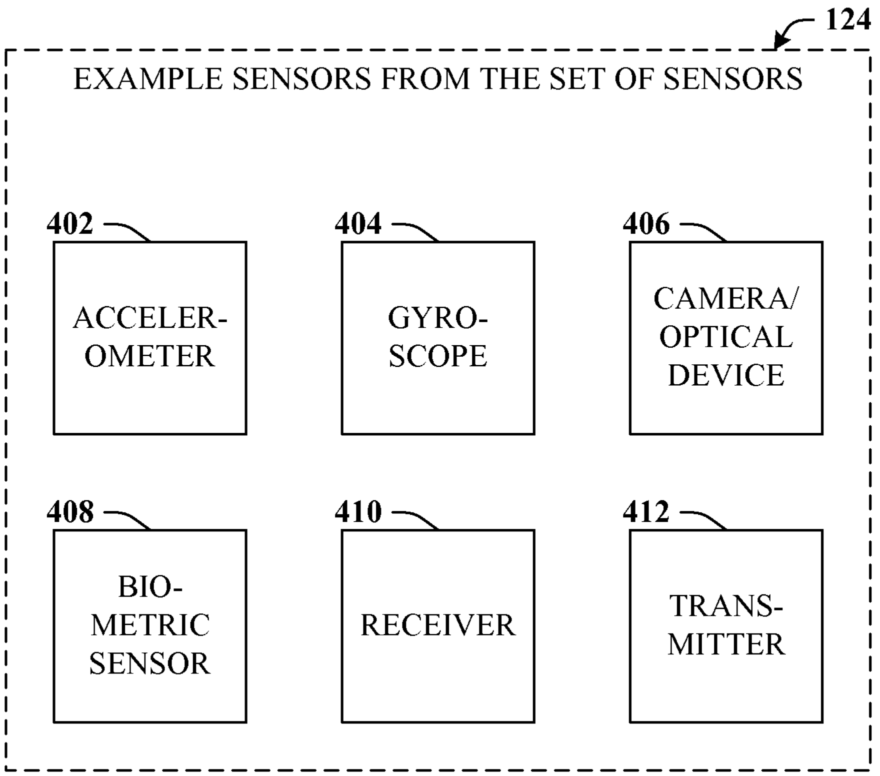
FIG. 4 illustrates a block diagram of several examples of sensor 124.

Referring briefly now to FIG. 4, several illustrative, but not necessarily limiting, examples of sensor 124 are depicted. Initially, it should be appreciated that, as with set 108 of I/O components, all or a subset of sensors 124 described herein can be onboard with respect to housing 102, and in some cases such might be required. In certain situations, however, there exists the potential that one or more sensor(s) 124 might be, or might be required to be, remote from housing 102 as well.

One example sensor 124 can be accelerometer 402. Accelerometer 402 is usually included in housing 102 and can be employed to determine motion, acceleration, and/or specific external force with respect to housing 102, which can be a factor in determining orientation 126. Similarly, housing 102 can include gyroscope 404 as another example sensor 124 for use in connection with orientation 126. Gyroscope 404 can be utilized to determine a change in angle or an angular rate of change of housing 102.

An example sensor 124 related to orientation 126 that can be included in, as well as remote from, housing 102 can be camera 406 (or other optical device such as a laser-based, LED-based, or certain optical range finders etc.). While camera 406 can exist in housing 102 and can be employed to aid in determination of orientation 126 (e.g., imaging objects and employing object recognition techniques to ascertain relative position/orientation), one or more cameras 406 can also be remote from housing 102 and employed to, e.g., image and/or identify housing 102 and determine a position (or aspects of orientation 126) of housing 102 relative to other components described herein as further detailed in connection with FIG. 6.

One example sensor 124 largely unrelated to orientation 126 but that can be included in housing 102 is biometric sensor 408. Biometric sensor 408 can obtain a biometric from a possessor of housing 102 in order to, inter alia, determine an identity of the possessor as well as certain emotional states of the possessor such as a level of excitement, anxiety, and so forth. While biometric data comes in many varieties, as housing 102 is typically a handheld object, the biometric obtained by sensor 408 will generally pertain to hand-based biometrics such as, e.g., fingerprints, grip configurations, hand geometry, or the like. However, it should be appreciated that as housing 102 can have associated components such as wearable devices (e.g. headsets, ear/eye pieces . . . ) other types of biometrics such as facial-based biometrics (e.g., thermograms, retinas, iris, earlobes, forehead) or behavioral biometrics (e.g. signature, voice, gait, gestures) can be obtain, potentially by biometric sensor 408 that is remote from housing 102. Further, aspects relating to data obtained by biometric sensor 408 are described infra.

In addition, for the sake of form and consistency, it should be appreciated that set 124 can also include receiver 410 or transmitter 412 that can facilitate propagation of data or information described herein. For example, sensors (e.g., 406, 408) that are remote from housing 102 might communicate with housing 102 by way of sensors 410, 412. Additionally or alternatively, it should be appreciated that sensors 410, 412 can be identical to, include, or be components of example I/O components 210, 212 described in connection with FIG. 2 supra.

Continuing the description of FIG. 1, recall presence component 122 can employ one or more sensors 124 to determine orientation 126 of housing 102. In more detail, orientation 126 can relate to 3-D space and can be one or more of a position of housing 102; a focus, direction, or target 128 of face 104; or a gesture, wherein the gesture can be a recent trajectory of housing 102. As an introduction to other discussion infra, target 128 (e.g. an object or component pointed to by a particular surface of face 104) will in many circumstances be one or more environmental component(s) 120. Furthermore, it should be appreciated that as gestures can be applicable to orientation 126, presence component 122 can maintain a history of or other state information relating to orientation 126, wherein the history or other state information can be saved to a data store (not shown) for later access or recall.

In addition, system 100 can include command component 130 that can determine instruction 118 based at least in part upon orientation 126. In accordance with an aspect of the claimed subject matter command component 130 can further employ input 116 in order to determine instruction 118. In more detail and/or to provide additional context, consider the following scenario.

Housing 102 is pointed at (e.g., a designated feature or surface of face 104 is directed at) a lamp (e.g. lights 302). Accordingly, the lamp can be selected as target 128 of housing 102 and/or face 104, which can be determined by presence component 122 based upon orientation 126. Selection of target 128 can be automatic based solely upon the focus of face 104; based upon a time interval such as focusing on the lamp for, say, 2 seconds selects the lamp as target 128; or based upon input 116 such as focusing on the lamp and pressing a particular button 202. Given the foregoing, the lamp can now be actively managed or controlled by way of instruction 118, which can be determined by command component 130 based at least upon orientation 126 and transmitted by communication component 106.

For example, the lamp can be switched on/off by, e.g. pressing a particular button 202. As another example, the lamp can be dimmed or brightened based upon a change in orientation 126 such as lowering or raising face 104. Similarly, lamp 126 can change colors (or traverse a frequency spectrum) by rotating housing 102 axially and/or by a possessor twisting housing 102 one direction or the other.

Appreciably, as instruction 118 can apply to a wide variety of devices, potentially including any environmental component 120 (which can include housing 102 or components thereof), the available set of potential instructions 118 can be virtually limitless in size. Accordingly, a set of potential orientations 126 and/or inputs 116 necessary to prompt each potential instruction 118 can be likewise virtually limitless, which, in conventional multifunctional or multimodal devices, can lead to several common difficulties, including, (1) complexity of use is generally proportional to the available features (e.g., the more features provided, the more difficult use becomes); and (2) available features are generally rigidly constrained by the form factor of a user-interface (e.g., small display or few input mechanisms equate to fewer features).

One potentially unforeseen benefit of the claimed subject matter can be mitigation of one or both of the aforementioned difficulties. In accordance therewith and to other related ends, system 100 can also include advisor component 132 that can provide guidance 134 in connection with orientation 118. Furthermore advisor component 132 can also provide guidance 134 with respect to input 116. Hence, guidance 134 provided by advisor component 132 can range from how to move housing 102 to create a desired result to which buttons or keys 202 and/or when these should be pressed, etc. (e.g., input 116) in order to create the desired result, as well as numerous other items, many of which are characterized in FIG. 5, which will be reference shortly before returning to discussion of FIG. 1.

Figure 5:
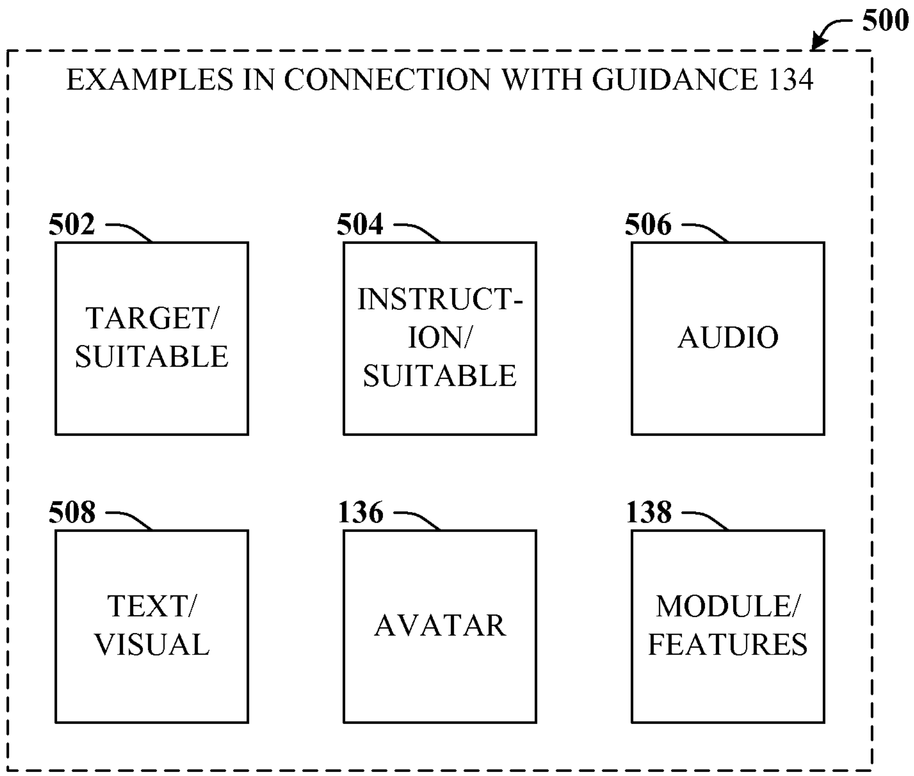
FIG. 5 is a block diagram of various examples in connection with guidance 134.

However, before turning to FIG. 5, it should be appreciated that in order to provide guidance 134, advisor component can facilitate (e.g., by way of communication component 106 and/or one or more components from set 108 of I/O components) articulation or display of guidance 134. Articulation of guidance 134 can be verbal and provided by way of speaker 206, potentially mitigating the need for a large form factor display. Articulation or display of guidance 134 can also be text-based provided by way of display 204. In addition, articulation or display of guidance 134 can be visual and also provided by way of display 204 or by way of interface 310 associated with one or more environmental components 120.

According to one aspect of the claimed subject matter, advisor component 132 can provide guidance 134 by way of avatar 136. Avatar 136 can include a distinct persona that can influence one or more of appearance of avatar 136, character of avatar 136, personality of avatar 136, behavior of avatar 136, speech-related aspects of avatar 136 such as inflection, accent, brogue, choice of dialogue, and so on. In addition, avatar 136 can affect what features are available to a possessor of housing 102.

For example, it is readily apparent that the claimed subject matter can be potentially beneficial in many ways. In one case, the claimed subject matter can appeal to the imagination of a child by leveraging qualities of a magical device, while in another case, the claimed subject matter can appeal to the sensibilities of an elderly person, the disabled, or infirm due to the many potential conveniences provided. Of course, other appealing characteristics exist, but the two cited examples: two potential possessors of housing 102, one young and one elderly serve as natural examples to illustrate additional features of the claimed subject matter.

As one illustration, the child might select the professor or wizard avatar 136, whereas the elderly person, say, the child's grandmother, might select avatar 136 that is reminiscent of Jimmy Stewart but switch to John Wayne for applications when a no-nonsense style is desired. Moreover, given that housing 102 can include or be operatively coupled to biometric sensor 408, the possessor, grandmother, child, or another party, can be determined automatically (e.g., by presence component 122) upon contact with housing 102 (or another component) in a manner suitable to obtain appropriate biometric information. Thus, the appropriate avatar 136 (as well as other suitable settings or preferences) can be selected and/or activated automatically upon identification of the possessor, and potentially changed based upon the possessor's emotional state, which can also be obtained by way of biometric sensor 408.

It should be understood that advisor component 132 can be updateable, configurable, and/or selectable, and such modifications can be automatic or periodic as well as manually performed. Such modifications can be accomplished by way of, e.g. connecting to a remote data store potentially by way of the Internet or another network or wide area network (WAN), which can be facilitated by components 210, 212. Moreover, according to an aspect of the claimed subject matter, at least one of avatar 136 or the available features are selectable based upon attachable module 138 that can be interfaced with housing 102 by way of one or more port(s) 140. For completeness it can be noted that port(s) 140 can be operatively coupled to or components of receiver/transmitter 210, 212 to facilitate wired-based communication.

As indicated supra, guidance 134 can be articulated or displayed and, further, that such can be provided by avatar 136, which can be presentable by way of an audio output, a text-based output, a video output or display, holographic (detailed infra) output or display as well as any suitable combination thereof. Additional aspects in connection with avatar 136 and attachable module 138 can be found with reference to FIG. 5 and the associated text below. Further aspects relating to holographic features are covered in FIG. 6.

Referring now to FIG. 5, various examples in connection with guidance 134 are provided in order to introduce additional context but not necessarily to limit the scope of the appended claims to only the provided examples. In particular, guidance 134 can relate to target 128 as well as a suitable orientation 126 to achieve target 128 as denoted by reference numeral 502. Additionally, guidance 134 can relate to instruction 118 or a suitable orientation 126 to facilitate a desired instruction 118 as indicated by reference numeral 504.

Moreover, guidance 134 can come in the form of audio 506 such as verbal guidance 134 or be text-based or visual-based as indicated by reference numeral 508. Furthermore, all or portions of guidance 134 can be presented by avatar 136 and accessibility to certain features or to certain avatars 136 can depend upon coupling attachable module 138 to housing 102. In more detail, consider the following.

A possessor of housing 102 aims face 104 at a lamp. Audio guidance 506 can be constructed by advisor component 132 and presented by avatar 136 in the specific avatar's own style or context. For example, "Your focus is the lamp. Press the red button to target this object." Or, similarly, "Please speak your target," to which a possessor of housing 102 can indicate "the lamp," which can be input 116 provided by microphone 208, followed by audio guidance 506, "Your target is the lamp. Press the red button to switch the lamp on." Likewise, audio guidance 506 can continue in the following manner. "Move the tip of the wand [e.g., face 104 of housing 102] up or down as you would a fishing pole to brighten or dim the lamp." Or, "twist the wand in one direction as though you are tightening or loosening a screw to change the color of the lamp." Appreciably, guidance 134 can be descriptive and based somewhat upon the character of possessor (e.g., "as though you are tightening or loosening a screw" vs. "rotate housing axially").

Likewise, text or visual guidance 508 can be presented by avatar 136 and can be displayed by display 204, interface 310, and/or can be holographic, which is further detailed in connection with FIG. 6. Additionally, a type of guidance 136 provided as well as features or instructions 118 available can depend upon attachable module 138. For example, management or interaction with lights 302 may require a first module 138 to be coupled to housing 102, while management or interaction with game console 306 might require a second module 138. As another example, a certain combination of modules 138 can yield access to a particular avatar 136. The modules can be solely utility-driven, or in some cases be aesthetic and/or thematic as well, such as fashioned to resemble bold geometric shapes or shapes that allude to magic characteristics, or shapes indicative of the environmental component(s) 120 that can be managed or interacted with that particular module 138. Appreciably, module(s) 138 can be utilized for permission-based access to certain features or avatars 136, as can biometric sensor 408.

Figure 6:
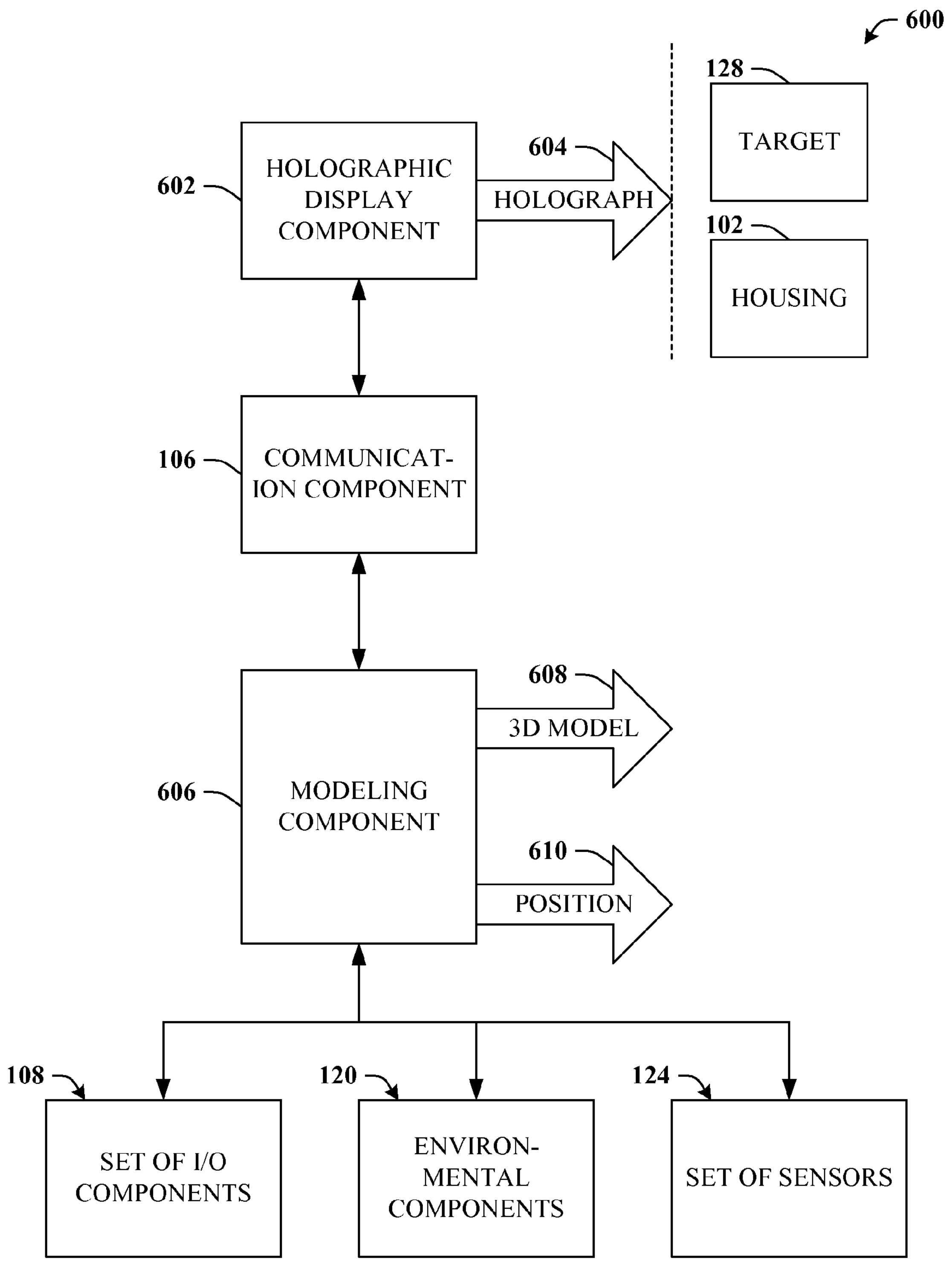
FIG. 6 depicts a block diagram of a system that can facilitate 3-D modeling of an environment and/or utilize holographic displays in order to provide rich interaction with components in an environment.

Referring now to FIG. 6, system 600 is depicted that can facilitate 3-D modeling of an environment and/or utilize holographic displays in order to provide rich interaction with components in an environment. In general, system 600 can include communication component 106 that can manage set 108 of I/O components and can be configured to receive input 116 and to transmit instruction 118. In accordance with the descriptions herein, communication component 106 can be operatively coupled to holographic display component 602. Holographic display component 602 can be configured to display holograph 604 substantially near to one of housing 102 or environmental component 120 that serves as target 128 of face 104. In either case, holographic display component 602 can be embedded in housing 102 or be a remote component As introduced supra, holograph 604 can be associated with guidance 134. Accordingly, holograph 604 can be a representation of avatar 136 or, e.g. a data display associated with instruction 118. It should be appreciated that by utilizing holograph 604 to facilitate guidance 134, a large form factor display can be unnecessary to provide a wealth of information, potentially mitigating certain difficulties associated with conventional devices or systems. To provide additional context, consider for a moment the ensuing examples.

Possessor executes orientation 126 sufficient to target thermostat 304. Possessor desires to modify a setting of thermostat 304 from 68 degrees to 72 degrees. While this can be accomplished in a manner similar to that described supra in connection with changing the brightness/intensity of light 302, e.g., by raising or lowering face 104 to update a setting, potentially accompanied by an explanation (e.g., guidance 134), which can be audio, visual, or text-based, and can be presented by way of avatar 136, other features can exist as well. For example, upon targeting thermostat 304, holographic display component 602 can produce a holographic interface or data display that, e.g. hovers nearby thermostat 304. The display can indicate in potentially large numerals that the current setting is for 68 degrees, and, possibly as possessor tilts housing 102 upward, the display can update, cycling through 69, 70, and so on to 72 degrees, where possessor is satisfied. Such can be useful given that unlike the example provided in connection with the lamp, which has visual indicia (e.g., the readily apparent brightness) to provide feedback to possessor, thermostat 304 may not otherwise have such visual indicia, and thus, it may be difficult for possessor to know how far to tilt housing to reach the desired setting. Utilizing holograph 604 can mitigate such a difficulty, as well as provide numerous other features and/or allow instruction(s) 118 (or associated orientation(s) 126) to be more intuitive.

Appreciable, the holographic data display/interface can be interface 310. While described supra, it is perhaps more understandable to note here that interface 310 can be associated with one or more environmental components 120, but need not necessarily be provided by or even managed or controlled by such component 120. It should be understood that a similar holographic data display/interface can be presented in connection with substantially any environmental component 120, and is not necessarily limited to merely thermostat 304. Moreover, holograph 604 can be presented by way of, e.g., an eyepiece associated with housing 102 worn by possessor. Additionally, it should be underscored that holograph 604 can also be a representation of avatar 136 illustrating visual depictions of guidance 134.

In addition to the foregoing, system 600 can further include modeling component 606 that can also be coupled to communication component 106. Modeling component 606 can construct 3-D geometric model 608 of the environment, which can, e.g., aid or in some cases facilitate many of the features or aspects described herein such as, e.g., determining aspects of orientation 126, target 128, environment components 120, and so forth.

In accordance with an aspect of the claimed subject matter, modeling component 606 can employ at least two cameras 406 from set 124 of sensors in order to determine a 3-D position 610 of housing 102. Position 610 can relate to a position in model 608, and position 610 of housing 102 can be an element of orientation 126 with other elements provided by, e.g., accelerometer 402, gyroscope 404, and so on. 3-D model 608 can include all or portions of suitable environmental component 120, and can be in some cases constructed on the fly based upon a corporeal location of housing 102. For example, modeling component 606 can broadcast a request and await acknowledgments from suitable environmental components 120 to construct the members of 3-D model 308. Subsequent data (or accompanying the acknowledgment), that includes location data or data that can be utilized to determine location can be employed to populated 3-D model 608 with the members at the proper locations.

Figure 7:
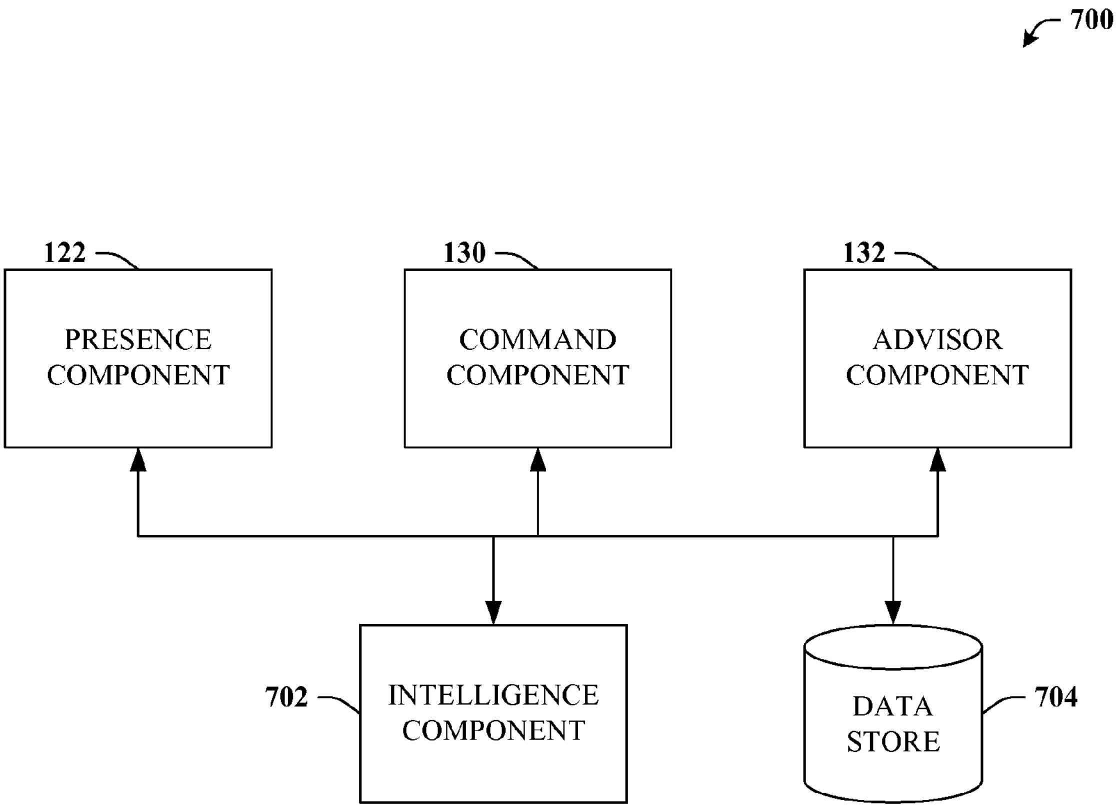
FIG. 7 depicts a block diagram of a system that can aid with various inferences.

With reference now to FIG. 7, system 700 that can aid with various determinations or inferences is depicted. Typically, system 700 can include presence component 122, command component 130, and advisor component 132, which in addition to or in connection with what has been described supra, can also make various inferences or intelligent determinations. For example, presence component 122 can intelligently determine target 128, as in some cases target 128 may not be precisely and/or accurately indicated. Furthermore, presence component 122 can also intelligently determine or establish levels of confidence in connection with a gesture or other aspects of orientation 126. In many cases, a particular orientation 126 will be defined to produce a particular instruction 118, however, in other cases, instruction 118 can be inferred based upon similarities to gestures for other target 128 components. For example, a gesture that dims lights 302 might not be expressly coded to work with other devices, yet the same gesture with, say, thermostat 304 targeted might function in a similar manner based upon intelligent inferences by command component 130. In addition, advisor component 132 can intelligently determine identity or emotional states based upon all relevant data sets include that provided by biometric sensor 408.

In addition, system 700 can also include intelligence component 702 that can provide for or aid in various inferences or determinations. It is to be appreciated that intelligence component 702 can be operatively coupled to all or some of the aforementioned components. Additionally or alternatively, all or portions of intelligence component 702 can be included in one or more of the components 122, 130, 132. Moreover, intelligence component 702 will typically have access to all or portions of data sets described herein, such as data store 704, and can furthermore utilize previously determined or inferred data.

Accordingly, in order to provide for or aid in the numerous inferences described herein, intelligence component 702 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
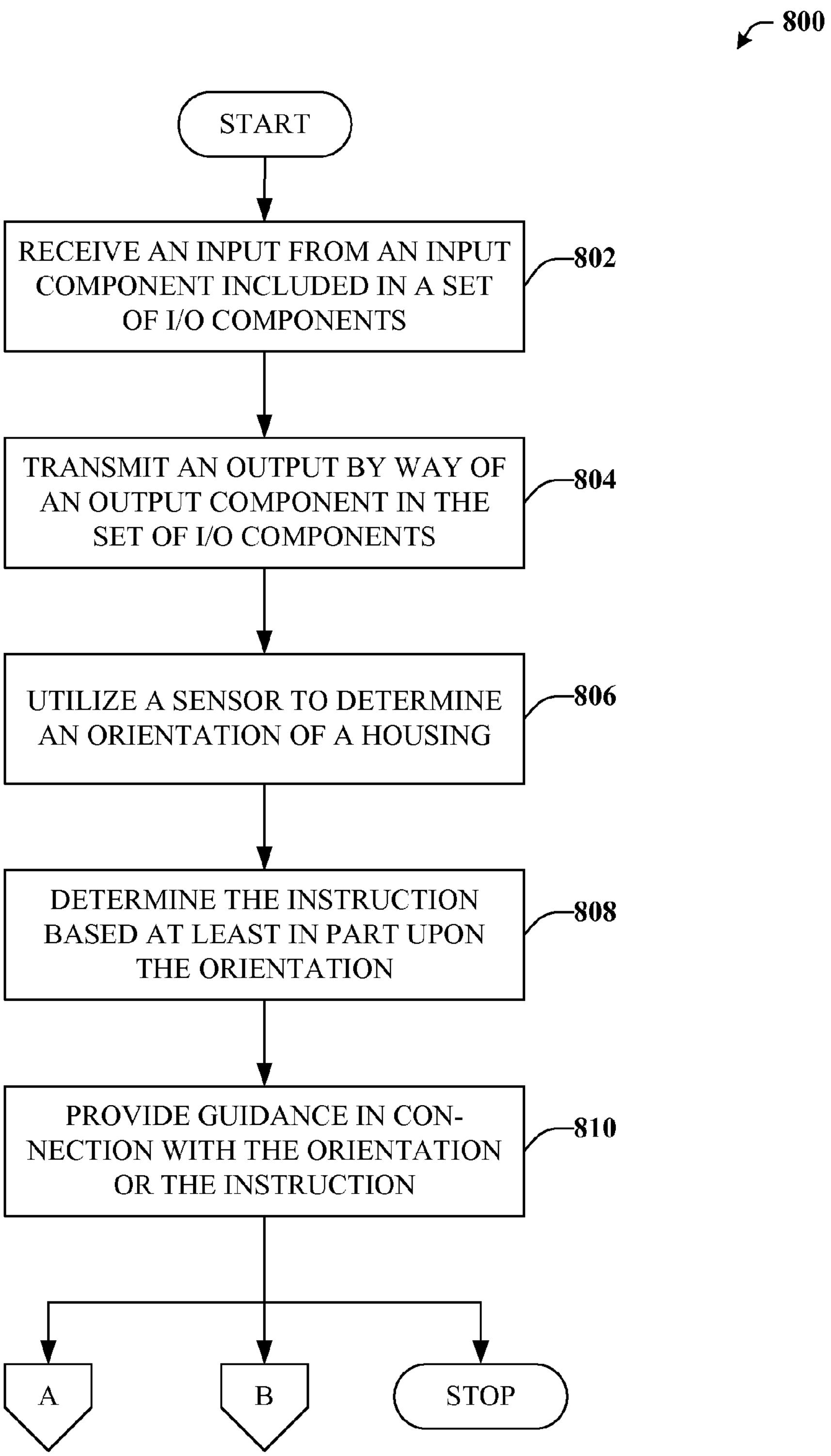
FIG. 8 is an exemplary flow chart of procedures that define a method for facilitating robust interactions with and/or management of environmental components.
Figure 9:
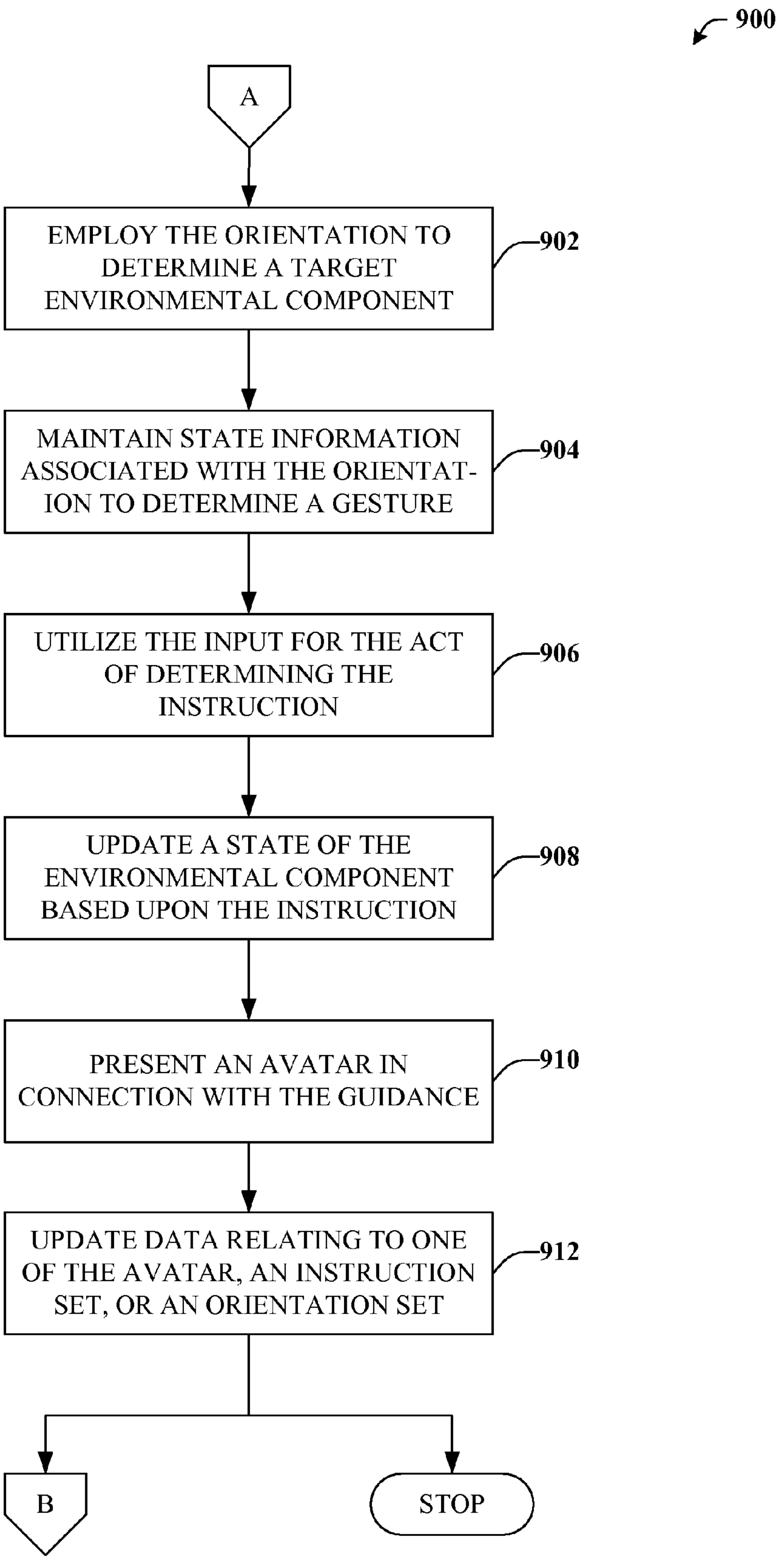
FIG. 9 illustrates an exemplary flow chart of procedures that define a method for providing additional features in connection with the orientation, instruction, or guidance.
Figure 10:
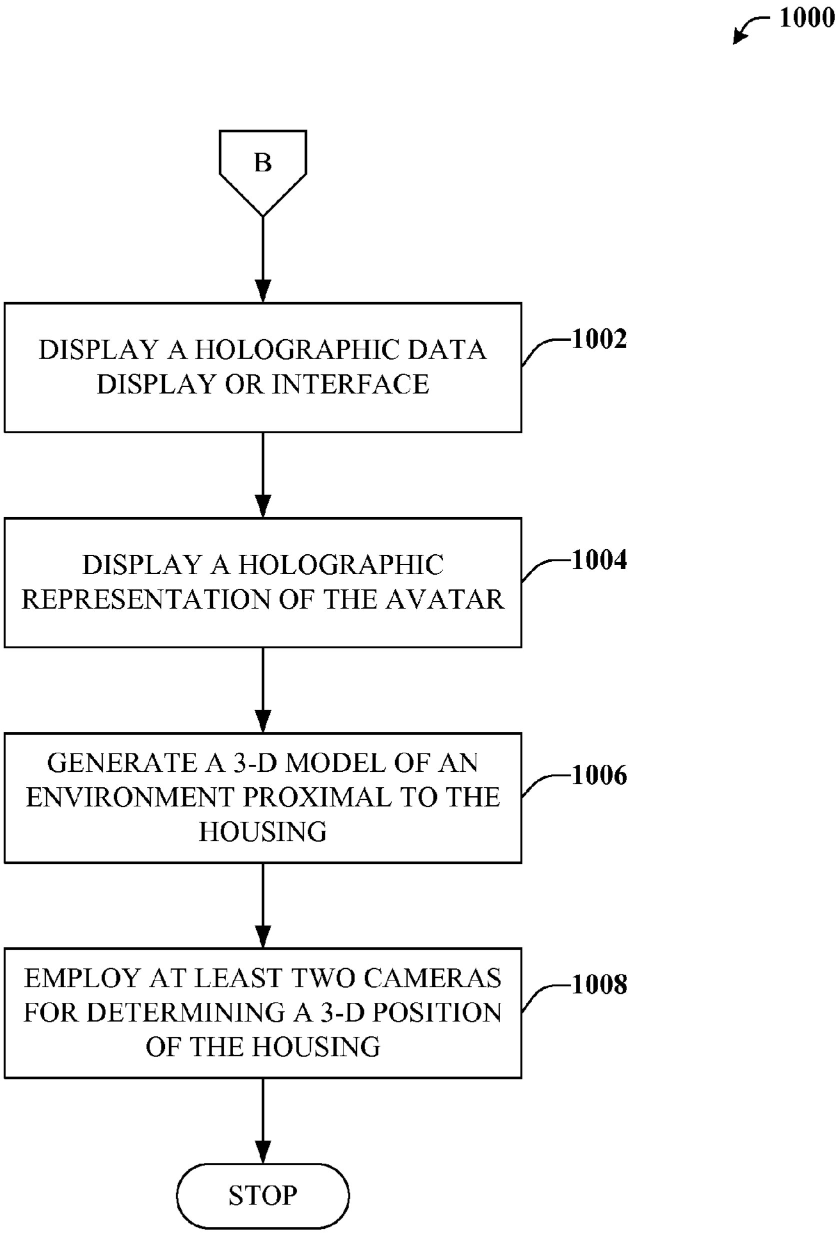
FIG. 10 depicts an exemplary flow chart of procedures defining a method for modeling the environment and/or providing holographic presentation for facilitating richer interactions.

FIGS. 8, 9, and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 8, exemplary method 800 for facilitating robust interactions with and/or management of environmental components is illustrated. Generally, at reference numeral 802, an input can be received from an input component included in a set of I/O components. Appreciably, the set of I/O components can include components such as a key, a button, a switch, a keypad, a keyboard, a monitor, a display, a speaker, a microphone, a receiver, a transmitter, etc., and the input component can be substantially any suitable component from the set as well as certain other suitable components not expressly enumerated.

At reference numeral 804, an instruction can be transmitted to an environmental component by way of an output component included in the set of I/O components. Likewise, the output component can be substantially any suitable component from the set as well as other suitable components even if not explicitly listed in the examples provided. The instruction can be or include a command, initialization data, verification data, authentication data, as well as other appropriate data sets or subsets.

At reference numeral 806, the instruction can be determined or inferred based at least in part upon an orientation of the housing. The orientation can be associated with a position of the housing, a direction, focus, or target of the housing, or a gesture associated with the housing. Based at least upon such data (as well as other potentially relevant data), the instruction can be determined or inferred, in some cases based upon intelligence-based machine learning techniques.

At reference numeral 808, guidance in connection with at least one of the orientation or the instruction can be provided. The guidance can be provided in various forms or formats, which can include verbal or textual articulation as well as visual display of the guidance. Accordingly, explanations of suitable orientations to accomplish a particular instruction, for example, can be presented in one or more formats and/or in a manner that can reduce, minimize, or mitigate the need for a complicated user interface in connection with comprehensive features.

Referring to FIG. 9, exemplary method 900 for providing additional features in connection with the orientation, instruction, or guidance is depicted. For example, at reference numeral 902, the orientation can be employed to determine a target environmental component. In general, the target environmental device will be one that is the focus of the housing or an associated face, surface, salient feature. However, such need not always be the case, as the target can be selected in advance such that subsequent changes in the focus (or other potential changes in orientation) do not unnecessarily select other target components.

At reference numeral 904, state information associated with the orientation of the housing can be maintained in order to determine a gesture. For example, the state information can include a recent history of the orientation of the housing which can essentially record the motion of the housing. At reference numeral 906, the input received in connection with act 802 can be utilized for determining the instruction. Accordingly, in addition to utilizing the orientation, various input such as pressing a particular key or button (e.g., input) can be used in unison with determining the appropriate instruction to transmit.

At reference numeral 908, a state of the environmental component can be updated based upon the instruction. For example, the environmental component can receive the instruction and respond by changing state. For example, a lamp can change from an "off" state to an "on" state based upon the instruction as can a setting of a thermostat, a position of a cursor, a volume of a stereo and so on and so forth.

At reference numeral 910, an avatar can be presented in connection with the guidance provided at act 810. In accordance therewith, the avatar can be the medium by which the guidance is articulated or displayed. For example, the avatar can be the speaker for articulated guidance or be a performer in visually displayed guidance. It is to be appreciated that the avatar can include a distinguishing personality or character (or traits thereof) and, in connection with reference numeral 912, can, along with an instruction set of available instructions or an orientation set of allowable and/or identifiable orientations, be updated to, e.g. provide newer, more useful, or more tailored data sets and/or a larger repertoire of available features.

With reference now to FIG. 10, method 1000 for modeling the environment and/or providing holographic presentation for facilitating richer interactions is illustrated. Generally, at reference numeral 1002, a holographic data display or interface can be presented. The holographic interface/display can be presented substantially near to a targeted environmental component and can provide beneficial feedback, visual indicia, intuitive instruction or explanation, navigation or control features, or the like.

At reference numeral 1004, a holographic representation of the avatar can be displayed. The holographic avatar can be presented substantially near to the housing or the targeted element and can provide visual guidance in connection with orientation as well as an associated or desired instruction or with the targeted environmental component. It should be appreciated and understood that the holographs displayed at acts 1002, 1004 be virtual in nature and can be presented by way of an eyepiece/headset associated with the housing.

At reference numeral 1006, a 3-D model of an environment proximal to the housing can be generated. The 3-D model can include the set of environmental components in respective positions that correspond to corporeal locations of the environmental components. The 3-D model can be generated on the fly and can adapt to various environments, environment types, or changes in location and/or transportation of the housing. At reference numeral 1008, two or more cameras from the set of I/O components can be employed for determining a 3-D position of the housing. The cameras can also be employed for determining or aiding in the determination of the orientation described at act 706.

Figure 11:
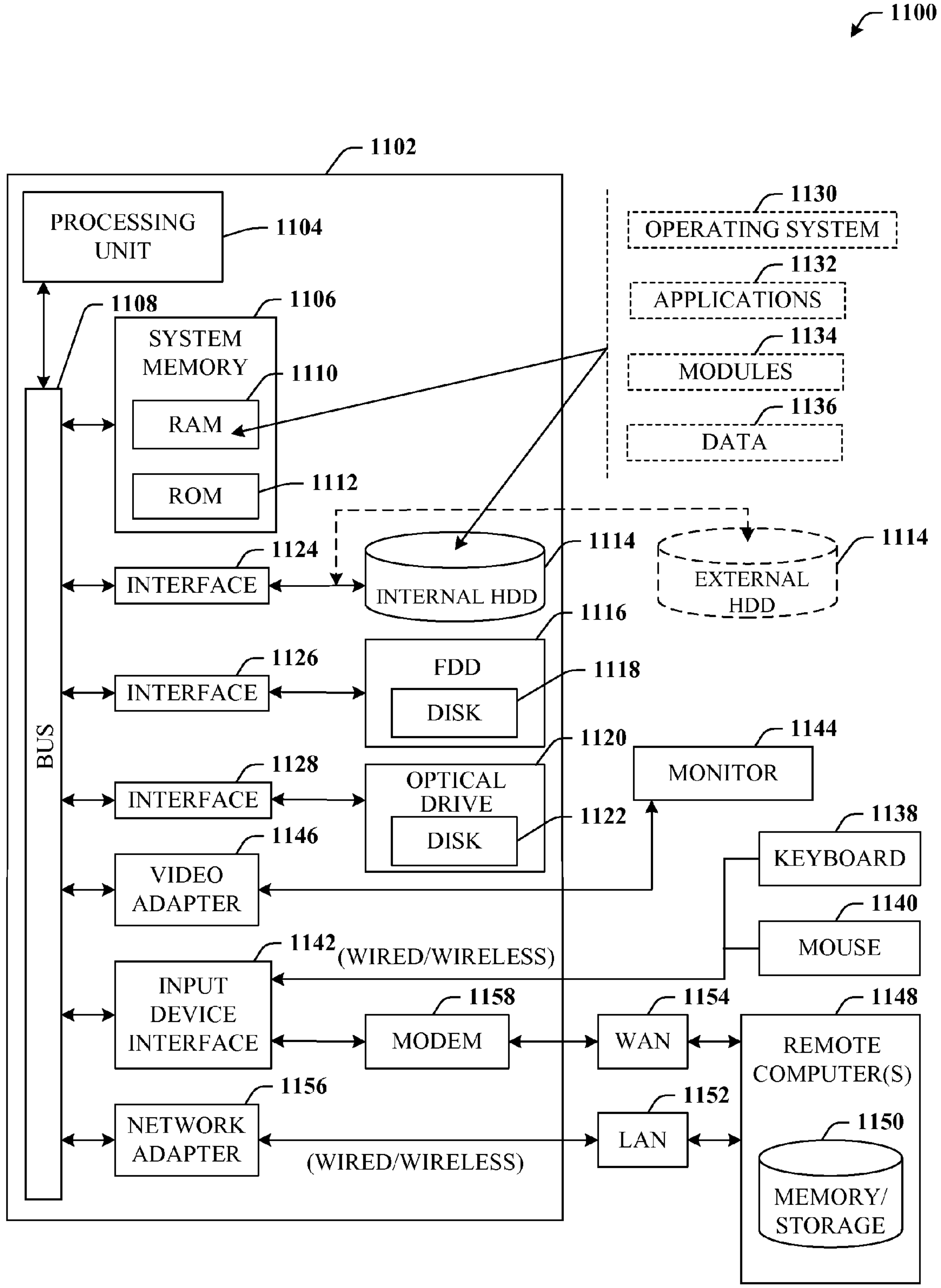
FIG. 11 illustrates a block diagram of a computer operable to execute the disclosed architecture.

Referring now to FIG. 11, there is illustrated a block diagram of an exemplary computer system operable to execute the disclosed architecture. In order to provide additional context for various aspects of the claimed subject matter, FIG. 11 and the following discussion are intended to provide a brief, general description of a suitable computing environment 1100 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the claimed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g. the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 12:
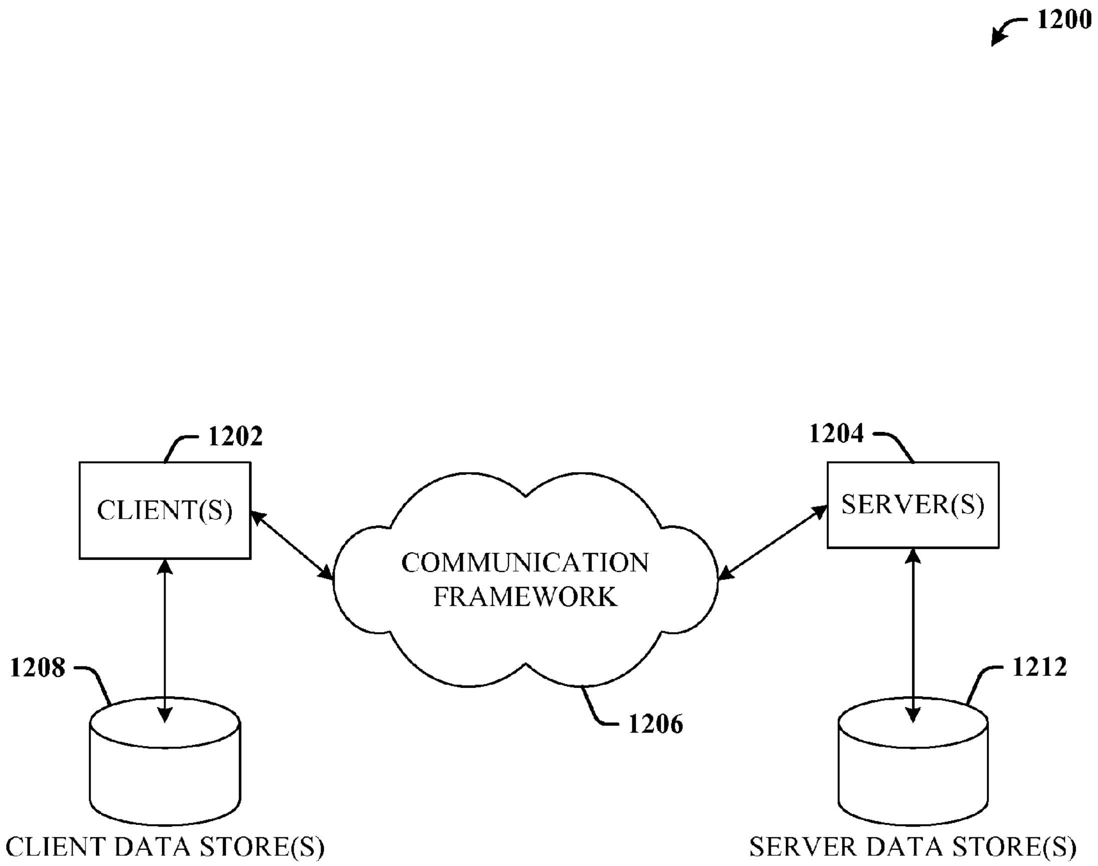
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g. cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates rich interaction with and/or management of environmental components included in an environment, comprising:

a housing with a face;

a communication component that manages a set of I/O components, the communication component is configured to receive an input by way of an input component from the set of I/O components and to transmit an instruction by way of an output component from the set of I/O components;

a presence component that employs a set of sensors to determine an orientation of the housing;

a command component that determines the instruction based at least in part upon the orientation of the housing; and an advisor component that is configured to provide guidance in connection with the orientation of the housing, the guidance regarding how to orient the housing to achieve the instruction, the guidance provided by way of an associated avatar, the avatar is presentable by way of an audio output, a text-based output, a video output or display, a holographic output or display, or combinations thereof.

2. The system of claim 1, the instruction is configured to update a state of an environmental component, the environmental component is configured to receive the instruction and to update the state.

3. The system of claim 2, the environmental component is at least one of a light device or a thermostat, and the instruction is configured to modify a setting of the thermostat or modify a setting of the light device.

4. The system of claim 2, the environmental component is at least one of a light device, a thermostat, a media device, a game console, a computer, a controller device, or a component of one or more of the foregoing.

5. The system of claim 1, the presence component determines the orientation of the housing based at least in part on a direction of the face of the housing or a gesture, of the housing.

6. The system of claim 1, the orientation indicates an environmental component targeted by the face of the housing.

7. The system of claim 1, the set of sensors includes at least one of an accelerometer, a gyroscope, a camera, a laser, a biometric sensor, a transmitter, or a receiver.

8. The system of claim 1, the command component further employs the input to determine the instruction.

9. The system of claim 1, the advisor component, in order to provide the guidance, facilitates articulation or display of at least one of the instruction, a targeted environmental component, a suitable orientation to produce the instruction, or a suitable orientation to target a particular environmental component.

10. The system of claim 1, further comprising an attachable module that, upon being communicatively attached to the housing, provides at least one of an additional avatar or additional available features.

11. The system of claim 1, further comprising a holographic display component that displays a holograph substantially near to one of the housing or a targeted environmental component, the holograph is at least one of a data display associated with the instruction or the avatar.

12. The system of claim 1, further comprising a modeling component that constructs a 3-D geometric model of the environment.

13. The system of claim 12, the modeling component employs at least two cameras from the set of sensors to determine a 3-D position of the housing.

14. The system of claim 12, the 3-D geometric model is dynamically constructed on the fly based upon a location of the housing.

15. A method comprising:

receiving an input from an input component included in a set of I/O components;

transmitting an instruction to an environmental component by way of an output component included in the set of I/O components;

utilizing at least one sensor from a set of sensors to determine an orientation of a housing;

determining the instruction based at least in part upon the orientation of the housing;

providing guidance in connection with at least one of the orientation of the housing or the instruction, the guidance is provided by way of articulation or display; and transmitting a display instruction to a holographic display component that displays a holograph, the holograph is at least one of a data display associated with the instruction or an avatar associated with the guidance.

16. The method of claim 15, further comprising at least one of the following acts:

employing the orientation to determine a target environmental component;

maintaining state information associated with the orientation of the housing in order to determine a gesture;

utilizing the input for the act of determining the instruction;

updating a state of the environmental component based upon the instruction;

presenting an avatar in connection with the guidance; or updating data relating to at least one of the avatar, an instruction set, or an orientation set.

17. The method of claim 15, further comprising at least one of the following acts:

generating a 3-D model of an environment proximate to the housing that includes the set of environmental components in respective positions that correspond to corporeal locations; or employing at least two cameras from the set of I/O components for determining a 3-D position of the housing in the environment.

18. One or more computer storage media comprising computer-executable instructions that, when executed by one or more processors, configure the one or more processors to perform acts comprising:

obtaining an input from an input component included in a set of I/O components;

transmitting an instruction to an environmental component by way of an output component included in the set of I/O components;

employing a set of sensors to determine an orientation of a housing about at least a substantially vertical axis;

employing at least two cameras from the set of I/O components for determining a 3-D position of the housing;

utilizing the orientation of the housing for determining the instruction; and presenting guidance in connection with at least one of the orientation of the housing or the instruction, the guidance is presented by way of articulation or display.

19. The system of claim 1, the set of sensors includes at least a biometric sensor, wherein the avatar is selected from a plurality of avatars based at least in part on information collected from the biometric sensor.

20. The system of claim 1, the set of sensors includes at least a biometric sensor, wherein an identity of a user and an emotional state of the user is determined based at least in part on information collected from the biometric sensor.

* * * * *